United States Patent
Bezdicek et al.

(10) Patent No.: US 9,392,072 B2
(45) Date of Patent: Jul. 12, 2016

(54) SYSTEMS AND METHODS FOR CONDUCTING COMMUNICATIONS AMONG COMPONENTS OF MULTIDOMAIN INDUSTRIAL AUTOMATION SYSTEM

(75) Inventors: Jan Bezdicek, Prelouc (CZ); Ladislav Bumbalek, Chrastava (CZ); Kenwood H. Hall, Hudson, OH (US); Jakub Slajs, Praha (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 667 days.

(21) Appl. No.: 12/761,237

(22) Filed: Apr. 15, 2010

(65) Prior Publication Data

US 2011/0258262 A1 Oct. 20, 2011

(51) Int. Cl.
- G06F 15/16 (2006.01)
- G06F 15/173 (2006.01)
- H04L 29/08 (2006.01)
- H04L 29/06 (2006.01)

(52) U.S. Cl.
CPC ....... *H04L 67/2823* (2013.01); *H04L 29/06068* (2013.01); *H04L 67/12* (2013.01); *H04L 67/16* (2013.01); *H04L 69/08* (2013.01); *H04L 69/18* (2013.01)

(58) Field of Classification Search
CPC .............. H04L 29/06; H04L 29/12009; H04L 29/12018; H04L 12/2814; H04L 12/4625; H04L 41/046; H04L 41/0213; H04L 41/0226; H04L 2012/40218; H04L 67/02; H04L 67/12; H04L 67/16; H04L 67/28; H04L 67/2823; H04L 69/03; H04L 69/08
USPC .......................... 709/206, 223, 224, 230, 232
See application file for complete search history.

(56) References Cited

U.S. PATENT DOCUMENTS

| | | | |
|---|---|---|---|
| 4,268,901 A | 5/1981 | Subrizi et al. |
| 4,347,564 A | 8/1982 | Sugano et al. |
| 4,623,964 A | 11/1986 | Getz et al. |
| 4,990,838 A | 2/1991 | Kawato et al. |
| 5,072,374 A | 12/1991 | Sexton et al. |

(Continued)

FOREIGN PATENT DOCUMENTS

| | | |
|---|---|---|
| DE | 200 16 625 U1 | 12/2000 |
| EP | 1 696 376 A2 | 8/2006 |

(Continued)

OTHER PUBLICATIONS

European Search Report relating to Application No. EP 07 11 7361, date of completion of the search Jan. 30, 2008 (1 pg.).

(Continued)

*Primary Examiner* — Farzana Huq
(74) *Attorney, Agent, or Firm* — Whyte Hirschboeck Dudek S.C.

(57) ABSTRACT

An improved industrial automation system and communication system for implementation therein, and related methods of operation, are described herein. In at least some embodiments, the improved communication system allows communication in the form of messages between modules in different control or enterprise domains. Further, in at least some embodiments, such communications are achieved by providing a communication system including a manufacturing service bus having two internal service busses with a bridge between the internal busses. Also, in at least some embodiments, a methodology of synchronous messaging is employed.

19 Claims, 14 Drawing Sheets

(56) References Cited

U.S. PATENT DOCUMENTS

| | | |
|---|---|---|
| 5,185,708 A | 2/1993 | Hall et al. |
| 5,253,184 A | 10/1993 | Kleinschnitz |
| 5,282,244 A | 1/1994 | Fuller et al. |
| 5,301,320 A | 4/1994 | McAtee et al. |
| 5,446,868 A | 8/1995 | Gardea, II et al. |
| 5,455,775 A | 10/1995 | Huber et al. |
| 5,485,620 A | 1/1996 | Sadre et al. |
| 5,504,891 A | 4/1996 | Motoyama et al. |
| 5,524,253 A | 6/1996 | Pham et al. |
| 5,537,585 A | 7/1996 | Blickenstaff et al. |
| 5,572,731 A | 11/1996 | Morel et al. |
| 5,611,059 A | 3/1997 | Benton et al. |
| 5,619,724 A | 4/1997 | Moore |
| 5,634,048 A | 5/1997 | Ryu et al. |
| 5,644,740 A | 7/1997 | Kiuchi |
| 5,675,748 A | 10/1997 | Ross |
| 5,699,520 A | 12/1997 | Hodgson et al. |
| 5,715,413 A | 2/1998 | Ishai et al. |
| 5,721,905 A | 2/1998 | Elixmann et al. |
| 5,761,499 A | 6/1998 | Sonderegger |
| 5,790,935 A | 8/1998 | Payton |
| 5,797,137 A | 8/1998 | Golshani et al. |
| 5,812,394 A | 9/1998 | Lewis et al. |
| 5,812,773 A | 9/1998 | Norin |
| 5,828,851 A | 10/1998 | Nixon et al. |
| 5,832,486 A | 11/1998 | Itoh et al. |
| 5,838,563 A | 11/1998 | Dove et al. |
| 5,848,273 A | 12/1998 | Fontana et al. |
| 5,862,052 A | 1/1999 | Nixon et al. |
| 5,884,025 A | 3/1999 | Baehr et al. |
| 5,884,033 A | 3/1999 | Duvall et al. |
| 5,913,029 A | 6/1999 | Shostak |
| 5,924,094 A | 7/1999 | Sutter |
| 5,936,539 A | 8/1999 | Fuchs |
| 5,940,294 A | 8/1999 | Dove |
| 5,940,854 A | 8/1999 | Green, Jr. et al. |
| 5,951,440 A | 9/1999 | Reichlinger |
| 5,960,420 A | 9/1999 | Leymann et al. |
| 5,966,705 A | 10/1999 | Koneru et al. |
| 5,970,494 A | 10/1999 | Velissaropoulos et al. |
| 5,978,577 A | 11/1999 | Rierden et al. |
| 5,980,078 A | 11/1999 | Krivoshein et al. |
| 5,983,016 A | 11/1999 | Brodsky et al. |
| 6,011,899 A | 1/2000 | Ohishi et al. |
| 6,032,208 A | 2/2000 | Nixon et al. |
| 6,044,217 A | 3/2000 | Brealey et al. |
| 6,061,740 A | 5/2000 | Ferguson et al. |
| 6,063,129 A | 5/2000 | Dadd et al. |
| 6,081,899 A | 6/2000 | Byrd |
| 6,098,116 A | 8/2000 | Nixon et al. |
| 6,101,531 A | 8/2000 | Eggleston et al. |
| 6,195,591 B1 | 2/2001 | Nixon et al. |
| 6,208,987 B1 | 3/2001 | Nihei |
| 6,234,899 B1 | 5/2001 | Nulph |
| 6,266,726 B1 | 7/2001 | Nixon et al. |
| 6,275,977 B1 | 8/2001 | Nagai et al. |
| 6,308,168 B1 | 10/2001 | Dovich et al. |
| 6,308,224 B1 | 10/2001 | Leymann et al. |
| 6,311,187 B1 | 10/2001 | Jeyaraman |
| 6,321,337 B1 * | 11/2001 | Reshef et al. .................. 726/14 |
| 6,327,511 B1 | 12/2001 | Naismith et al. |
| 6,336,152 B1 | 1/2002 | Richman et al. |
| 6,356,920 B1 | 3/2002 | Vandersluis |
| 6,377,957 B1 | 4/2002 | Jeyaraman |
| 6,393,566 B1 | 5/2002 | Levine |
| 6,398,106 B1 | 6/2002 | Ulvr et al. |
| 6,409,082 B1 | 6/2002 | Davis et al. |
| 6,411,987 B1 | 6/2002 | Steger et al. |
| 6,415,983 B1 | 7/2002 | Ulvr et al. |
| 6,421,743 B1 | 7/2002 | Byron et al. |
| 6,425,051 B1 | 7/2002 | Burton et al. |
| 6,438,744 B2 | 8/2002 | Toutonghi et al. |
| 6,445,963 B1 | 9/2002 | Blevins et al. |
| 6,446,202 B1 | 9/2002 | Krivoshein et al. |
| 6,457,053 B1 | 9/2002 | Satagopan et al. |
| 6,469,986 B1 | 10/2002 | Lecheler et al. |
| 6,473,656 B1 | 10/2002 | Langels et al. |
| 6,477,435 B1 | 11/2002 | Ryan et al. |
| 6,484,061 B2 | 11/2002 | Papadopoulos et al. |
| 6,501,996 B1 | 12/2002 | Bieber |
| 6,505,247 B1 | 1/2003 | Steger et al. |
| 6,510,352 B1 | 1/2003 | Badavas et al. |
| 6,539,271 B2 | 3/2003 | Lech et al. |
| 6,539,430 B1 | 3/2003 | Humes |
| 6,539,458 B2 | 3/2003 | Holmberg |
| 6,615,091 B1 | 9/2003 | Birchenough et al. |
| 6,631,519 B1 | 10/2003 | Nicholson et al. |
| 6,643,555 B1 | 11/2003 | Eller et al. |
| 6,661,426 B1 | 12/2003 | Jetha et al. |
| 6,664,981 B2 | 12/2003 | Ashe et al. |
| 6,681,227 B1 | 1/2004 | Kojima et al. |
| 6,687,817 B1 | 2/2004 | Paul |
| 6,697,797 B1 | 2/2004 | Hoggatt et al. |
| 6,704,746 B2 | 3/2004 | Sokolov et al. |
| 6,714,949 B1 | 3/2004 | Frey, Jr. |
| 6,714,981 B1 | 3/2004 | Skaggs et al. |
| 6,738,821 B1 | 5/2004 | Wilson et al. |
| 6,745,089 B2 | 6/2004 | Rasmussen et al. |
| 6,748,486 B2 | 6/2004 | Burton et al. |
| 6,751,634 B1 | 6/2004 | Judd |
| 6,758,403 B1 | 7/2004 | Keys et al. |
| 6,760,721 B1 | 7/2004 | Chasen et al. |
| 6,760,732 B2 | 7/2004 | Busshart et al. |
| 6,763,395 B1 | 7/2004 | Austin |
| 6,766,312 B2 | 7/2004 | Landt |
| 6,768,987 B1 | 7/2004 | Couch et al. |
| 6,769,095 B1 | 7/2004 | Brassard et al. |
| 6,778,537 B1 | 8/2004 | Ishibashi |
| 6,801,822 B1 | 10/2004 | Fujiwara et al. |
| 6,807,632 B1 | 10/2004 | Carpentier et al. |
| 6,809,732 B2 | 10/2004 | Zatz et al. |
| 6,832,120 B1 | 12/2004 | Frank et al. |
| 6,836,892 B2 | 12/2004 | Ikoma et al. |
| 6,839,790 B2 | 1/2005 | Barros De Almeida et al. |
| 6,842,769 B1 | 1/2005 | Kim et al. |
| 6,853,920 B2 | 2/2005 | Hsiung et al. |
| 6,865,509 B1 | 3/2005 | Hsiung et al. |
| 6,868,413 B1 | 3/2005 | Grindrod et al. |
| 6,868,538 B1 | 3/2005 | Nixon et al. |
| 6,874,145 B1 | 3/2005 | Ye et al. |
| 6,874,146 B1 | 3/2005 | Iyengar |
| 6,880,060 B2 | 4/2005 | Talagala et al. |
| 6,889,282 B2 | 5/2005 | Schollenberger |
| 6,901,578 B1 | 5/2005 | Beaven et al. |
| 6,904,473 B1 | 6/2005 | Bloxham et al. |
| 6,920,474 B2 | 7/2005 | Walsh et al. |
| 6,928,521 B1 | 8/2005 | Burton et al. |
| 6,930,985 B1 | 8/2005 | Rathi et al. |
| 6,934,749 B1 | 8/2005 | Black et al. |
| 6,938,079 B1 | 8/2005 | Anderson et al. |
| 6,944,626 B2 | 9/2005 | Cameron et al. |
| 6,947,947 B2 | 9/2005 | Block et al. |
| 6,950,900 B1 | 9/2005 | McKean et al. |
| 6,952,727 B1 * | 10/2005 | Lindner et al. ................ 709/224 |
| 6,954,770 B1 | 10/2005 | Carlson et al. |
| 6,961,728 B2 | 11/2005 | Wynblatt et al. |
| 6,973,556 B2 | 12/2005 | Milligan et al. |
| 6,975,913 B2 | 12/2005 | Kreidler et al. |
| 7,043,311 B2 | 5/2006 | Nixon et al. |
| 7,089,530 B1 | 8/2006 | Dardinski et al. |
| 7,096,465 B1 | 8/2006 | Dardinski et al. |
| 7,146,355 B2 | 12/2006 | Chu-Carroll |
| 7,162,312 B2 | 1/2007 | Gross et al. |
| 7,171,476 B2 | 1/2007 | Maeda et al. |
| 7,225,193 B2 | 5/2007 | Mets et al. |
| 7,251,222 B2 | 7/2007 | Chen et al. |
| 7,308,454 B2 | 12/2007 | Abineri et al. |
| 7,483,994 B1 | 1/2009 | Stephens et al. |
| 7,664,869 B2 * | 2/2010 | Baker et al. .................... 709/230 |
| 7,672,737 B2 | 3/2010 | Hood et al. |
| 7,835,894 B2 * | 11/2010 | Kwon .............................. 703/6 |
| 7,912,945 B2 | 3/2011 | Little |
| 8,086,758 B1 | 12/2011 | Allan et al. |
| 8,180,402 B2 * | 5/2012 | Dewey et al. .................. 455/558 |

(56) References Cited

U.S. PATENT DOCUMENTS

| | | | |
|---|---|---|---|
| 8,266,308 B2* | 9/2012 | Rydberg et al. | 709/230 |
| 2002/0007286 A1 | 1/2002 | Okamoto | |
| 2002/0012401 A1 | 1/2002 | Karolys et al. | |
| 2002/0013748 A1 | 1/2002 | Edmison et al. | |
| 2002/0069167 A1 | 6/2002 | Conlow | |
| 2002/0073236 A1 | 6/2002 | Helgeson et al. | |
| 2002/0087786 A1 | 7/2002 | Burton et al. | |
| 2002/0091838 A1 | 7/2002 | Rupp et al. | |
| 2002/0103785 A1 | 8/2002 | Harvey | |
| 2002/0116453 A1 | 8/2002 | Todorov et al. | |
| 2002/0131404 A1 | 9/2002 | Mehta et al. | |
| 2002/0161827 A1 | 10/2002 | Brault | |
| 2002/0173984 A1 | 11/2002 | Robertson et al. | |
| 2002/0188366 A1 | 12/2002 | Pepper et al. | |
| 2002/0194577 A1 | 12/2002 | Connor et al. | |
| 2003/0014387 A1 | 1/2003 | Kreidler et al. | |
| 2003/0036876 A1 | 2/2003 | Fuller, III et al. | |
| 2003/0065673 A1 | 4/2003 | Grobler et al. | |
| 2003/0090514 A1 | 5/2003 | Cole et al. | |
| 2003/0093471 A1 | 5/2003 | Upton | |
| 2003/0120710 A1 | 6/2003 | Pulsipher et al. | |
| 2003/0123467 A1 | 7/2003 | Du et al. | |
| 2003/0126308 A1 | 7/2003 | Kim | |
| 2003/0172145 A1 | 9/2003 | Nguyen | |
| 2003/0177114 A1 | 9/2003 | Lin et al. | |
| 2003/0212828 A1 | 11/2003 | Miyazaki et al. | |
| 2003/0218641 A1 | 11/2003 | Longobardi | |
| 2004/0006401 A1 | 1/2004 | Yamada et al. | |
| 2004/0024995 A1 | 2/2004 | Swaine | |
| 2004/0044421 A1 | 3/2004 | Brune et al. | |
| 2004/0073565 A1 | 4/2004 | Kaufman et al. | |
| 2004/0098153 A1 | 5/2004 | Neudeck | |
| 2004/0098269 A1 | 5/2004 | Wise et al. | |
| 2004/0117624 A1 | 6/2004 | Brandt et al. | |
| 2004/0153171 A1 | 8/2004 | Brandt et al. | |
| 2004/0158842 A1 | 8/2004 | Gilfix et al. | |
| 2004/0167790 A1 | 8/2004 | Grasse | |
| 2004/0193449 A1 | 9/2004 | Wildman et al. | |
| 2004/0196855 A1 | 10/2004 | Davies et al. | |
| 2004/0199655 A1 | 10/2004 | Davies et al. | |
| 2004/0203620 A1 | 10/2004 | Thome et al. | |
| 2004/0210629 A1 | 10/2004 | Klindt et al. | |
| 2004/0249771 A1 | 12/2004 | Berg et al. | |
| 2004/0260591 A1 | 12/2004 | King | |
| 2004/0268186 A1 | 12/2004 | Maturana et al. | |
| 2005/0005289 A1 | 1/2005 | Adolph et al. | |
| 2005/0015397 A1 | 1/2005 | Abineri et al. | |
| 2005/0044112 A1 | 2/2005 | Yamamoto et al. | |
| 2005/0065626 A1 | 3/2005 | Kappelhoff et al. | |
| 2005/0065829 A1 | 3/2005 | Birkhoelzer | |
| 2005/0065971 A1 | 3/2005 | Honda | |
| 2005/0069853 A1 | 3/2005 | Tyson et al. | |
| 2005/0091349 A1 | 4/2005 | Scheibli | |
| 2005/0102672 A1 | 5/2005 | Brothers | |
| 2005/0107897 A1 | 5/2005 | Callaghan | |
| 2005/0108247 A1 | 5/2005 | Heinla et al. | |
| 2005/0120021 A1 | 6/2005 | Tang et al. | |
| 2005/0129247 A1 | 6/2005 | Gammel et al. | |
| 2005/0135782 A1 | 6/2005 | Ando et al. | |
| 2005/0154741 A1 | 7/2005 | Hebert et al. | |
| 2005/0166215 A1 | 7/2005 | Holloway et al. | |
| 2005/0177687 A1 | 8/2005 | Rao | |
| 2005/0187925 A1 | 8/2005 | Schechinger et al. | |
| 2005/0193118 A1 | 9/2005 | Le et al. | |
| 2005/0198248 A1 | 9/2005 | Morimoto et al. | |
| 2005/0216460 A1 | 9/2005 | Yoon et al. | |
| 2005/0223010 A1 | 10/2005 | Murray | |
| 2005/0251527 A1 | 11/2005 | Phillips et al. | |
| 2005/0256788 A1 | 11/2005 | Mukai | |
| 2005/0267952 A1 | 12/2005 | Ricciardi et al. | |
| 2005/0268253 A1 | 12/2005 | Johnson et al. | |
| 2005/0278373 A1 | 12/2005 | Corbett et al. | |
| 2006/0004475 A1 | 1/2006 | Brackett et al. | |
| 2006/0004847 A1 | 1/2006 | Claudatos et al. | |
| 2006/0064428 A1 | 3/2006 | Colaco et al. | |
| 2006/0067209 A1 | 3/2006 | Sheehan et al. | |
| 2006/0074498 A1 | 4/2006 | Kalan et al. | |
| 2006/0173895 A1 | 8/2006 | Engquist et al. | |
| 2006/0195817 A1 | 8/2006 | Moon | |
| 2006/0212855 A1 | 9/2006 | Bournas et al. | |
| 2006/0230130 A1* | 10/2006 | Cho et al. | 709/223 |
| 2006/0259160 A1 | 11/2006 | Hood et al. | |
| 2007/0067497 A1 | 3/2007 | Craft et al. | |
| 2007/0079028 A1 | 4/2007 | Hall | |
| 2007/0186011 A1* | 8/2007 | Batke et al. | 709/246 |
| 2007/0226318 A1 | 9/2007 | Rydberg et al. | |
| 2007/0268922 A1 | 11/2007 | Dougan et al. | |
| 2008/0028068 A1 | 1/2008 | Nochta et al. | |
| 2008/0109829 A1* | 5/2008 | Kenst et al. | 719/328 |
| 2008/0140759 A1 | 6/2008 | Conner et al. | |
| 2008/0189636 A1 | 8/2008 | Hood et al. | |
| 2010/0172372 A1* | 7/2010 | Sichner et al. | 370/463 |
| 2011/0258359 A1 | 10/2011 | Bezdicek et al. | |
| 2011/0258637 A1 | 10/2011 | Bezdicek et al. | |
| 2012/0041572 A1* | 2/2012 | Halsall | 700/19 |

FOREIGN PATENT DOCUMENTS

| | | |
|---|---|---|
| EP | 1746799 A2 | 1/2007 |
| EP | 1906623 A1 | 4/2008 |
| WO | 2006021052 A1 | 3/2006 |

OTHER PUBLICATIONS

Extended European Search Report relating to Application No. EP 07 117409, date of completion of the search Jan. 24, 2008 (8 pgs.).

Extended European Search Report relating to Application No. EP 05 01 6793, date of completion of the search Nov. 28, 2005 (3 pgs.).

PCT International Search Report and Written Opinion of the International Search Authority, relating to International Application No. PCT/US06/18180, date of mailing of the International Search Report Jul. 7, 2008 (1 pg.), date of completion of Opinion Jun. 10, 2008 (4 pgs.), (5 pgs.).

WO 2006/124471 A3, International Search Report and PCT Written Opinion of the International Searching Authority, relating to International Application No. PCT/US06/18122, date of mailing of the International Search Report May 6, 2008 (1 pg.), date of completion of Opinion Apr. 15, 2008 (8 pgs.), (10 total pgs.).

WO 2006/124488 A3, International Search Report and PCT Written Opinion of the International Searching Authority, relating to International Application No. PCT/US06/18181, date of mailing of the International Search Report Mar. 4, 2008 (2 pgs.), date of completion of Opinion Feb. 12, 2008 (9 pgs.), (13 total pgs.).

WO 2006/124513 A3, International Search Report and PCT Written Opinion of the International Searching Authority, relating to International Application No. PCT/US06/18238, date of mailing of the International Search Report Jan. 24, 2008 (1 pg.), date of completion of Opinion Jan. 11, 2008 (5 pgs.), (7 total pgs.).

WO 2006/124547 A3, International Search Report and PCT Written Opinion of the International Searching Authority, relating to International Application No. PCT/US06/18350, date of mailing of the International Search Report Jun. 19, 2008 (2 pgs.), date of completion of Opinion May 14, 2008 (5 pgs.), (9 total pgs.).

U.S. Appl. No. 11/238,537, Non-final Office Action, dated Apr. 22, 2008 (48 pgs.).

U.S. Appl. No. 11/238,537, Non-final Office Action, dated Oct. 20, 2008 (44 pgs.).

U.S. Appl. No. 11/238,537, Non-final Office Action, dated Apr. 15, 2009 (22 pgs.).

U.S. Appl. No. 11/238,606, Non-final Office Action, dated Jan. 18, 2008 (23 pgs.).

U.S. Appl. No. 11/238,606, Final Office Action, dated Jul. 2, 2008 (17 pgs.).

U.S. Appl. No. 11/238,606, Non-final Office Action, dated Nov. 20, 2008 (19 pgs.).

U.S. Appl. No. 11/238,606, Final Office Action, dated Jun. 3, 2009 (24 pgs.).

U.S. Appl. No. 11/238,607, Non-final Office Action, dated Apr. 2, 2008 (37 pgs.).

(56) References Cited

OTHER PUBLICATIONS

U.S. Appl. No. 11/238,607, Final Office Action, dated Oct. 8, 2008 (32 pgs.).
U.S. Appl. No. 11/238,607, Non-final Office Action, dated Mar. 6, 2009 (61 pgs.).
U.S. Appl. No. 11/239,567, Non-final Office Action, dated Nov. 2, 2007 (39 pgs.).
U.S. Appl. No. 11/239,567, Final Office Action, dated May 30, 2008 (29 pgs.).
U.S. Appl. No. 11/239,567, Non-final Office Action, dated Nov. 14, 2008 (34 pgs.).
U.S. Appl. No. 11/239,567, Final Office Action, dated May 1, 2009 (35 pgs.).
U.S. Appl. No. 11/240,335, Non-final Office Action, dated May 15, 2008 (31 pgs.).
U.S. Appl. No. 11/536,338, entitled "Distributed Message Engines and Systems", filed Sep. 28, 2006 (49 pgs.).
U.S. Appl. No. 11/536,395, entitled "Message Engine", filed Sep. 28, 2006 (48 pgs.).
U.S. Appl. No. 11/536,269, entitled "Messaging Configuration System", filed Sep. 28, 2006 (48 pgs.).
U.S. Appl. No. 11/536,411, entitled "Message Engine Searching and Classification", filed Sep. 28, 2006 (51 pgs.).
Cheah R. S-S et al., "Implementing Manufacturing Message Specification Services and Protocol Using ISO Development Environment", IEEE Tencon, Bejing, China, 1993 (pp. 553-556).
Goldman R. et al., "From Semistructured Data to XML: Migrating the Lore Data Model and Querly Language", In: ACM Sigmod Workshop on the Web and Databases (WebDB 1999), Philadelphia, PA, Jun. 3-4 (pp. 1-7).
Kubiatowicz J. et al., "OceanStore: An Architecture for Global-Scale Persistent Storage", ASPLOS 2000, Cambridge, Massachusetts, USA, Nov. 2000 (pp. 1-12).
Ozsoyoglu et al., "Database Systems for Programmable Logic Controllers", Statistical and Scientific Database Management, Lecture Notes in Computer Science, vol. 420, 1990 (pp. 183-199).
Pitzek, S. et al., "Configuration and Management of a Real-Time Smart Transducer Network", IEEE, 2003 (pp. 1-10).
Tanenbaum A.S., "Computer Networks", Pearson Education, US, XP-002466380, 2003 (pp. VII-XVII and pp. 869-901).
Tanenbaum A.S., "Structured Computer Organization", Prentice-Hall, U.S., XP-002466381, 1999 (pp. VII-XV and pp. 653-669).
European Search Report; EP Application No. 11162627.1; Sep. 1, 2011; 8 pages.
European Search Report; EP Application No. 11162628.9; Aug. 31, 2011; 9 pages.
European Extended Search Report; EP Application No. 11162623.0; Oct. 19, 2011; 5 pages.
Machado, G.B. et al; "Integration of Embedded Devices Through Web Services: Requirements, Challenges and Early Results"; Computers and Communications; 11th IEEE Symposium on Cagliari Italy; Jun. 2006; pp. 353-358.
U.S. Appl. No. 12/761,243; Non-Final Office Action; Mar. 21, 2012; 7 pages.
U.S. Appl. No. 12/761,228; Non-Final Office Action; May 25, 2012; 15 pages.
European Patent Application No. 11162627.1; Office Communication; Oct. 5, 2012; 5 pages.
U.S. Appl. No. 12/761,228; Final Office Action; Dec. 7, 2012; 17 pages.
European Patent Application No. 11 162 627.1; Response to Office Communication; dated Mar. 13, 2013; 10 pages.
European Patent Application No. 11162628.9 Office Communication ; dated Sep. 30, 2011; 1 page.
Notice of Allowance for U.S. Appl. No. 12/761,228; dated Nov. 7, 2014; 11 pages.
Notice of Allowance for U.S. Appl. No. 12/761,228; dated Jun. 24, 2014; 11 pages.
European Office Action for European Patent Application No. 11 162 628.9 dated Apr. 21, 2015, 4 pages.
Michael Young et al., "The Duality of Memory and Communication in the Implementation of a Multiprocessor Operating System", Institute for Software Research, Carneigie Mellon University, School of Computer Science, Nov. 1987, 25 pages.

\* cited by examiner

SYSTEMS AND METHODS FOR CONDUCTING COMMUNICATIONS AMONG COMPONENTS OF MULTIDOMAIN INDUSTRIAL AUTOMATION SYSTEM

CROSS-REFERENCE TO RELATED APPLICATIONS

Statement Regarding Federally Sponsored Research or Development

Field of the Invention

The present invention relates to the integration of industrial automation systems having multiple domains such as control and enterprise domains and, and more particularly, to systems and methods for conducting or facilitating the conducting of communications among various components of such multi-domain industrial automation systems.

BACKGROUND OF THE INVENTION

Industrial automation systems include various enterprise software applications (which are also known as information technology (IT) or manufacturing software applications) for monitoring and/or managing different aspects of production, as well as various manufacturing (or automation) controllers which control the actual manufacturing processes. The enterprise software applications and manufacturing controllers can be considered to operate in two different domains of an industrial automation system, namely, an enterprise domain and a control domain, respectively.

Conventionally, communication between an enterprise software application and a controller (between the different domains) is problematic, due to different programming languages, different messaging protocols, and different execution environments that can exist. Current communication systems between these two domains rely on the use of customized code to enable communication in various forms. However, such systems for facilitating messaging or message exchange between these domains are often unpredictable, fault intolerant, and not performance scalable. Additionally, such systems struggle with trade-offs between overhead burden (such as memory footprint, CPU cycles, etc.) and application coupling. The message processing load is typically not optimally distributed across the system in accordance with system capabilities and, if one part of the system is shut down, alternative messaging routes are not always in place to allow production to continue.

Further, the design and installation of controllers in control systems of such industrial automation systems often require incremental changes to be applied to the controllers over time, and new controllers or interface screens to be added to a human machine interface (HMI). Such control systems can become unstable, screens can lock up, and data can be lost. Also, limited diagnostic functions of the communication system can make problems difficult to uncover. Solutions are then typically based on estimates established through limited system metrics. Additionally, communication system management during configuration and runtime is typically complex and difficult. The multiple messaging protocols in many systems complicate configuration and management of such systems. This can be aggravated when many different applications and controllers are involved. This complexity often hinders the system's capacity to provide reports on higher level system information and reduces the ability to easily configure such systems.

For at least these reasons, therefore, it would be advantageous if one or more improved systems or methods for conducting or facilitating the conducting of communications among various components of such multidomain industrial automation systems could be developed.

BRIEF SUMMARY OF THE INVENTION

The present inventors have recognized that an improved communication system for an industrial automation system can overcome one or more of the disadvantages described above. The improved communication system in at least some embodiments allows communication in the form of messages between modules in different control or enterprise domains. Further, in at least some embodiments, such communications are achieved by providing a communication system including a manufacturing service bus having two internal service busses with a bridge between the internal busses. In at least some such embodiments, the manufacturing service bus is operable to define virtual channels between these modules. Also, in at least some embodiments, a predefined messaging framework is employed in which at least some of the modules have a common defined interface and/or employ standard instructions such as send (SEND) and receive (RECV) instructions. Further, in at least some embodiments, the communication system employs service oriented architecture (SOA) which relies on a common service description language employed by the modules, and/or an event driven architecture (EDA), wherein events and alarms in real time can be noted and acted upon.

In at least one embodiment, the present invention relates to a method of communicating between a control-level module and an enterprise-level module. The method includes receiving a first message in accordance with a first protocol from the control-level module at a receive manager of a bridge device, and sending a second message from the bridge device back to the control-level module when the bridge device has determined that the first message has been successfully received. The method also includes analyzing the first message at a transaction manager of the bridge device so as to determine an adapter suitable for enabling further communication of the first message to the enterprise-level module, and communicating a third message based upon the first message to the enterprise-level module through the use of the adapter.

BRIEF DESCRIPTION OF THE DRAWINGS

Embodiments of the invention are disclosed with reference to the accompanying drawings. The drawings are for illustrative purposes only. Thus, the invention is not limited in its application to the details of construction or the arrangement of the components illustrated in the drawings, but rather the invention is capable of other embodiments or of being practiced or carried out in other various manners. Like reference numerals are used to indicate like components. In the drawings.

DETAILED DESCRIPTION OF THE PREFERRED EMBODIMENT

Figure 1:
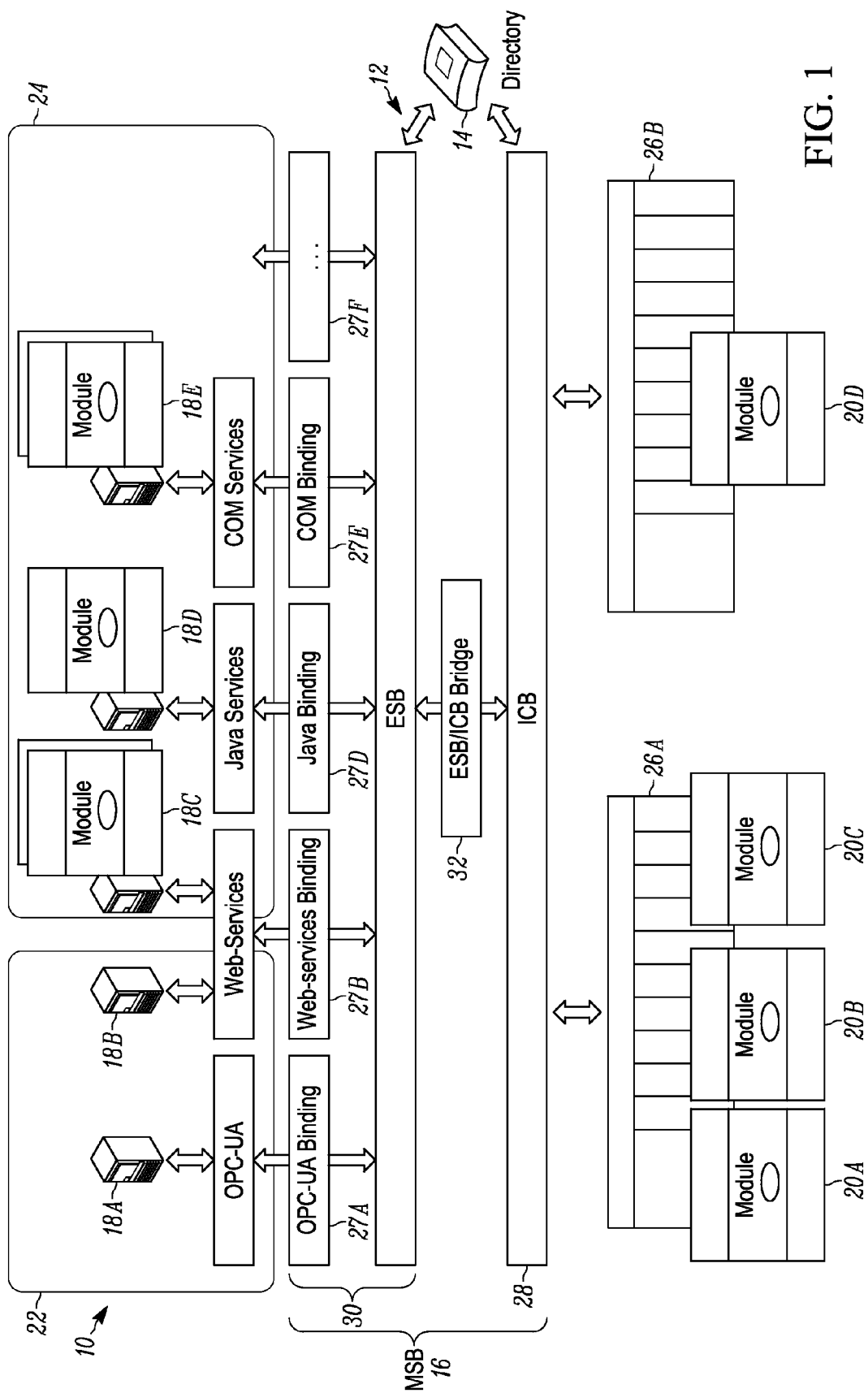
FIG. 1 is a schematic diagram of an exemplary industrial automation system including an exemplary communication system linking multiple modules in enterprise and control domains, in accordance with at least some embodiments of the present invention.

FIG. 1 illustrates an exemplary industrial automation system 10 including an exemplary communication system 12 which includes a directory 14 and a manufacturing service bus (MSB) 16. The directory 14 is in communication with the MSB 16 and stores and publishes service description documents (digital data files or data blocks) in a common service language. The MSB 16 is in communication with various components or modules of an enterprise domain of the system 10, which are shown as enterprise modules 18A-18E and can also be referred to as enterprise software modules or simply software modules. Additionally, the MSB 16 is also in communication with various components or modules of a control domain of the system 10, which are shown as control modules 20A-20D. Each of the modules 18A-18E and 20A-20D is an application level object (or simply an application) that is managed by one or more users and that represents encapsulated functionality within the industrial automation system 10.

More particularly with respect to the enterprise modules 18A-18E, these modules can include various applications, for example, manufacturing execution system (MES) applications and enterprise resource planning (ERP) applications. Specific examples of enterprise modules include a recipe procedure on an application server, an instance of an HMI screen (or other HMI module), an MES application such as RSScheduler, a data aggregation module at the area level running on an application server, or any of a variety of other applications or software modules. As for the control modules 20A-20D, these modules can include a variety of applications providing specific capabilities, for example, periodic or event-based execution models, access to controlled process input and output data, and pre-allocated resources. Although none of the control modules 20A-20D is shown to be, a human-machine interface (HMI) module, in at least some embodiments one or more control modules can be present that are HMI modules. Such HMI modules can run on an operator panel and can utilize an HMI development graphic language to provide graphical output.

The various modules 18A-18E and 20A-20D operate upon and are supported by operating system(s) running on various hardware device(s), as a result of which each module is able to execute and to provide desired functionality and behavior. The supporting operating system and hardware device corresponding to each of the modules 18A-18E and 20A-20D can be termed an execution framework for that module. Each respective execution framework for each respective one of the modules 18A-18E and 20A-20D can have standard capabilities, such as messaging and module lifecycle management, as well as specific capabilities unique to the execution framework type. Also, each execution framework type typically supports one or more different programming languages.

More particularly with respect to the enterprise modules 18A-18E, each of these can be run on a corresponding execution framework that includes a personal computer (PC) 22, as shown with respect to the enterprise modules 18A-18B, or another hosting device such as an enterprise server 24, as shown with respect to the enterprise modules 18C-18E. These execution frameworks can operate using various programming languages such as C, C++, Java, etc. As for the control modules 20A-20D (including other types of control modules such as HMI modules, which are not shown in FIG. 1), these can be run on one or more industrial controllers such as industrial controllers 26A, 26B as shown in FIG. 1, which in some embodiments can take the form of programmable logic controllers (PLCs), and which in some embodiments can utilize ladder logic, functional block programs, structure text, or the like. The control modules 20A-20D can take a variety of forms including, for example, the form of open connectivity unified architecture (OPC UA) modules, Profinet devices, or Modbus devices, among others.

The particular numbers and arrangements of enterprise and control modules, their respective execution frameworks, and other components of the industrial automation system 10 can vary depending upon the embodiment. For example, while in the embodiment of FIG. 1 each of the enterprise modules 18A, 18B are supported by the same PC 22 while each of the enterprise modules 18C-18E are supported by the same enterprise server 24, in other embodiments each enterprise module can be supported its own respective, distinct hardware control or processing device. Likewise, the number of types of hardware devices supporting control modules such as the control modules 20A-20D can vary with the embodiment, as can the numbers and types of operating systems running on the hardware devices supporting any of the enterprise modules 18A-18E or control modules.

Physically, the various components of an industrial automation system such as the system 10 can be located at a variety of locations depending upon the embodiment. For example, the enterprise modules 18A-18E and control modules 20A-20D of the industrial automation system 10 and their respective execution frameworks can be located in various physical locations (and need not necessarily be located at the same location or plant). The communication system 12 and any of its component parts (e.g., the directory 14 or the MSB 16 or its component parts) can also be can be located in a variety of places, for example, in the chassis of an industrial controller such as one of the controllers 26A or 26B, on a PC such as PC 22, on an enterprise server such as the server 24, etc. Indeed, different parts of the communication system 12 can be found at different locations.

The communication system 12 enables communications between and among the various modules 18A-18E and 20A-20D. The communications can take a variety of forms and in the present embodiment include message exchanges of a variety of types. More particularly, the message exchanges can involve one or more of the sharing of data in one or more databases, the delivery of messages/information, and service invocations by which one or more of the modules invoke services of other(s) of the modules. Service invocations and responses in some embodiments can involve messages that are built from system libraries and that are sent and received via the communication system 12. The communication system 12 facilitates message exchange among the various modules 18A-18E and 20A-20D, regardless of their type, execution framework, or standalone messaging capabilities. The communication system 12 makes available to the modules 18A-18E and 20A-20D a set of messaging application programming interfaces (APIs) and a set of common design, configuration, deployment, runtime, and diagnostic tools, as described below. The communication system 12 (and particularly channels established thereby, as discussed in further detail below) also provides for both real-time messaging and scalability (important features for automation control modules), as well as service discovery, quality of service, security, message persistence, and message traceability functionality/features.

Further as shown in FIG. 1, the MSB 16 includes two internal busses, an industrial control bus (ICB) 28 and an enterprise service bus (ESB) 30. In the present embodiment, the MSB 16 can be implemented in Java and be run on an Exxx hardware platform, albeit in other embodiments the MSB can be implemented in other languages and/or run on other types of hardware devices. The two internal buses 28, 30 are linked by a bridge 32, which is also part of the MSB 16. Additionally as shown, each of the buses 28, 30 and the bridge 32 of the MSB 16 are also in communication with the directory 14. In general, the MSB 16 provides bindings (specifications) by which the MSB is able to establish and maintain communication linkages with the various enterprise modules 18A-18E and control modules 20A-20D. In the present embodiment, one or more of the bindings of the MSB 16 in particular utilize Web Services Description Language (WSDL), which serves as a common service description language in the system 10. That said, given that the various modules 18A-18E and 20A-20D operate in different execution frameworks using different technologies, a variety of different bindings can be employed by the MSB 16 in communicating with the different modules. The characteristics of the bindings of the MSB 16, as implemented in relation to various execution frameworks of the modules 18A-18E and 20A-20D, result in a set of messaging options, such as guaranteed delivery, delivery acknowledgement, real-time delivery, and message persistency.

More particularly, the ESB 30 provides a common integration platform that combines different communication standards/protocols and intelligent routing by which the MSB 16 can be reliably connected with the various enterprise modules 18A-18E. The ESB 30 operates to route messages to and from the enterprise modules 18A-18E, provide module and service discovery, provide a common service description language, provide bindings for different communication technologies, and provide security support, including authentication and authorization. With respect to the bindings that are provided, as shown in FIG. 1, these can include, for example, an OPC UA binding 27A, a Web-services binding 27B, a Java binding 27D, a COM binding 27E, as well as possibly one or more other bindings 27F. The ESB 30 can take a variety of forms depending upon the embodiment and, in one embodiment, utilizes an off-the-shelf (commercial or open source) ESB technology such as the Mule™ ESB (which can be tailored for the specific needs of the industrial automation system 10). Also depending upon the embodiment, the ESB 30 can include different adapters that encapsulate the most common communication and/or IT-based protocols, such as various implementations of a JMS (Java Message Service) interface, queuing systems, Web services, and other protocols including for example SMTP (Simple Mail Transfer Protocol), FTP (File Transfer Protocol), HTTP (HyperText Transfer Protocol), POP3 (Post Office Protocol Version 3), IMAP (Internet Message Access Protocol), etc. Exemplary adapters are discussed in further detail with respect to FIG. 11. Generally speaking, communications via the ESB 30 can be conducted in accordance with any of a variety of different protocols or formats depending upon the embodiment including, for example, Simple Object Access Protocol (SOAP), message-oriented middleware (MOM), Distributed Component Object Model (DOOM) and Java Messaging Service (JMS).

By comparison, the ICB 28 in the present embodiment utilizes (e.g., is built on top of) the Common Industrial Protocol (CIP), which is a standard application level protocol for the manufacturing environment, and is used in a variety of networking technologies such as Ethernet/IP, DeviceNet, ControlNet, and others. While based upon the CIP, the ICB 28 also includes additional features in addition to those provided by the CIP, including supporting a common service description language in an open and reusable format, supporting event driven architecture, and providing dynamic service binding, as described in more detail below. Although not necessarily always in communications with the ESB 30, in the present embodiment the ICB 28 is capable of communicating with the ESB at least at some times by way of the bridge 32. As discussed in further detail below, the bridge 32 is capable of facilitating the establishment of one or more channels between one or more of the enterprise modules 18A-18E and one or more of the control modules 20A-20D via the ESB 30 and the ICB 28. The establishment of such channels is further made possible by the directory 14, which is in communication with one or more of the bridge 32, the ICB 28 and the ESB 30 and operates to publish service description documents respectively relating to the respective modules 18A-18E and 20A-20D. The bridge 32 in particular in some embodiments can be implemented in an industrial controller such as the controllers 26A, 26B supporting the control modules 20A-20D (or another chassis based module associated with one or more of the control modules) or an IT server such as the enterprise server 24.

Figure 2:
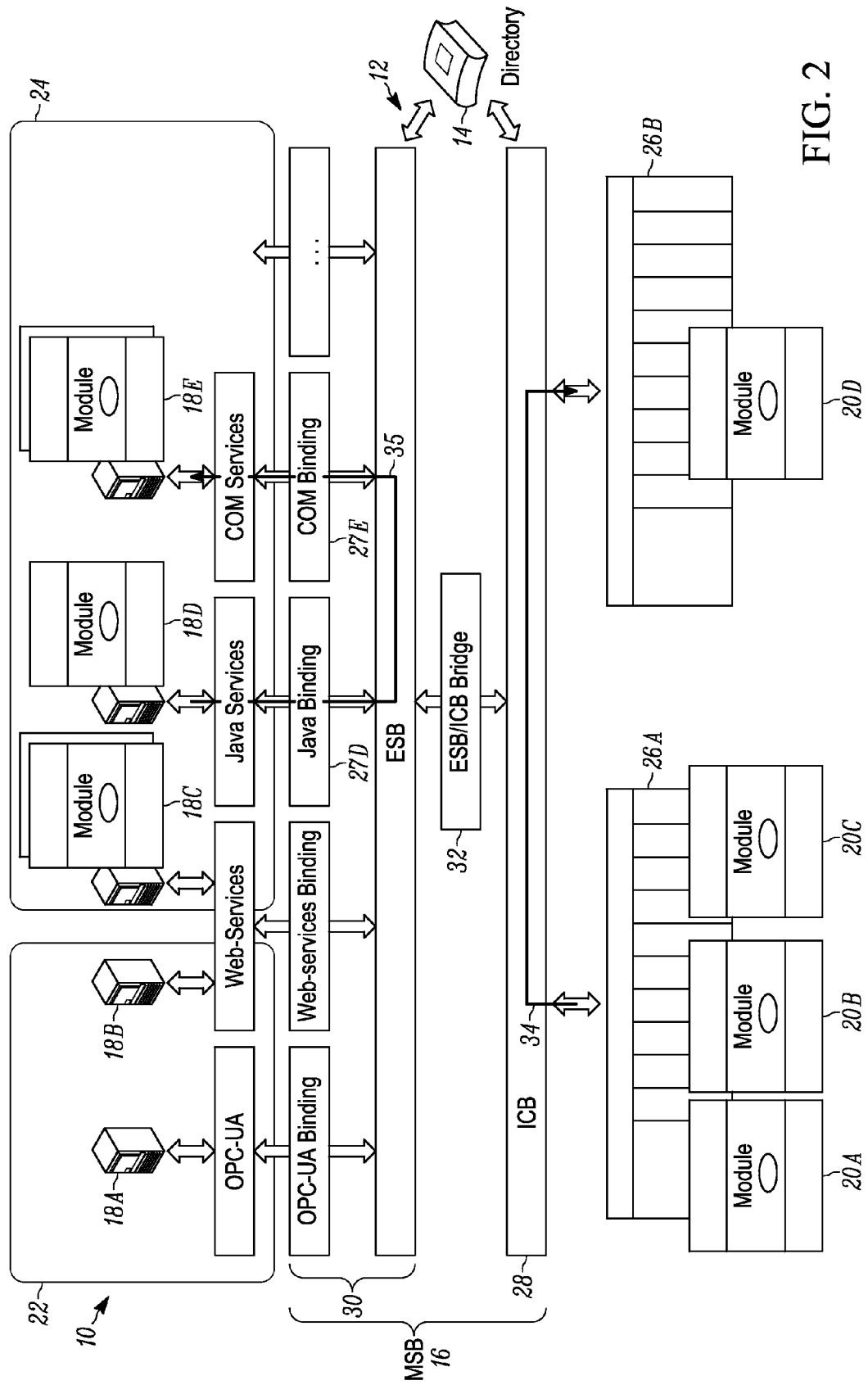
FIG. 2 is a schematic diagram showing non-bridged messaging using the exemplary communication system of FIG. 1.
Figure 3:
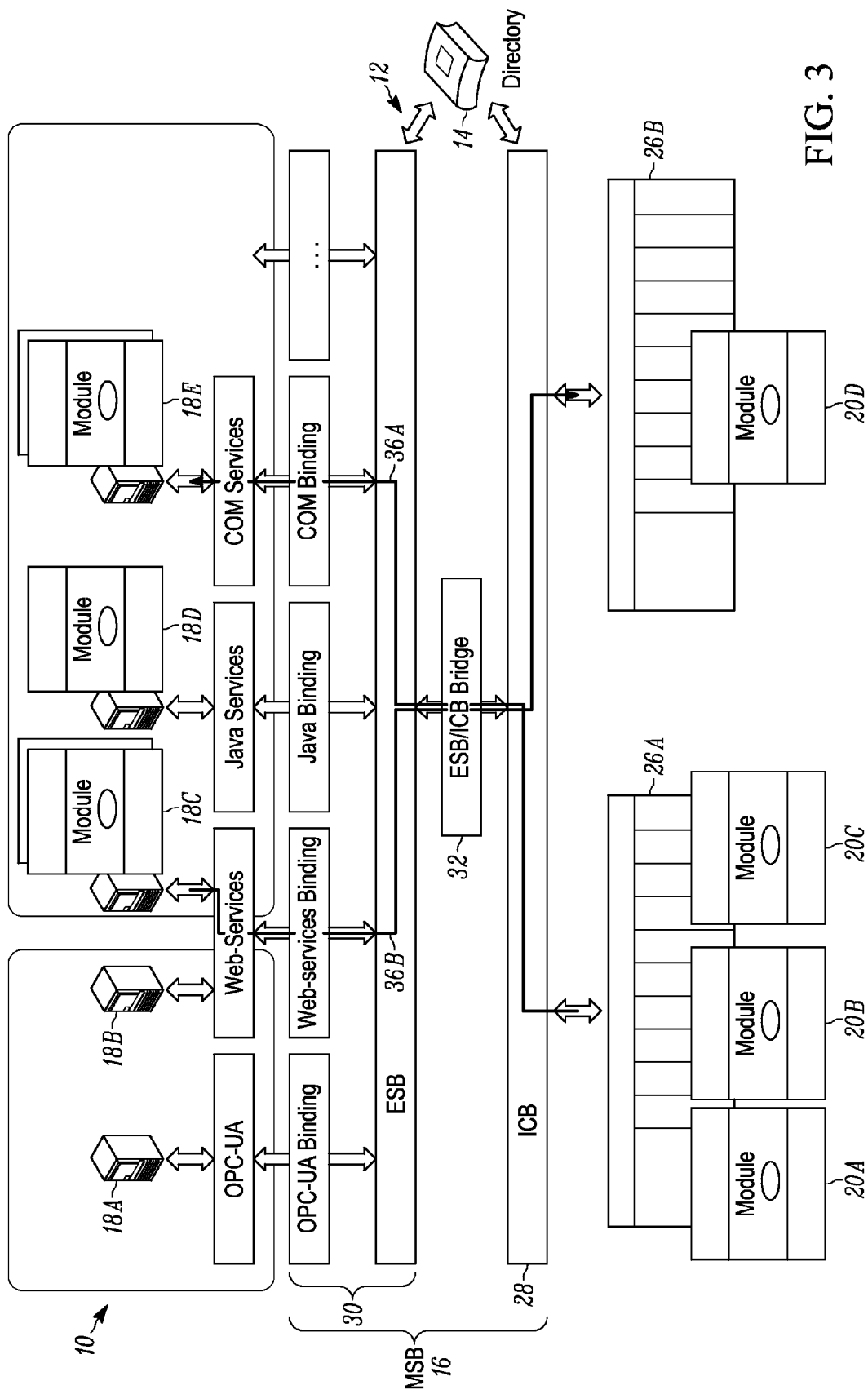
FIG. 3 is a schematic diagram showing bridged messaging using the exemplary communication system of FIG. 1.

Referring to FIGS. 2 and 3, the MSB 16 allows for communications to be provided between different ones of the enterprise modules 18A-18E and control modules 20A-20D in a variety of manners. Some of these communications make use of each of the ICB 28, the ESB 30 and the bridge 32, while other communications only make use of one or more of these components. Referring specifically to FIG. 2, the MSB 16 is capable of conducting communications that proceed between different ones of the control modules 20A-20D (but that do not involve any of the enterprise modules 18A-18E) as well as capable of conducting communications that proceed between different ones of the enterprise modules (but that do not involve any of the control modules). In particular in this regard, FIG. 2 shows exemplary messaging between one or more of the control modules 20A-20C supported by the industrial controller 26A and the control module 20D supported by the industrial controller 26B, as indicated by a connector 34. As shown, such messaging occurs within only the ICB 28 of the MSB 16 and does not require the use of the bridge 32 or the ESB 30. Also, FIG. 2 shows exemplary messaging between two of the enterprise modules 18D and 18E (which in this example reside on the same enterprise server 24), as indicated by a connector 35. In this case, the messaging occurs within only the ESB 30 (including the Java and COM bindings 27D and 27E) of the MSB 16 and does not involve the bridge 32 of the ICB 28.

By comparison, as schematically illustrated in FIG. 3, the MSB 16 also allows for messaging to occur between one or more of the control modules 20A-20D and one or more of the enterprise modules 18A-18E, that is, between modules of the control domain and the enterprise domain. For example, as shown, the MSB 16 allows for the control module 20D on the industrial controller 26B to communicate with the enterprise module 18C on the enterprise server 24, as well as allows for the control module 26A to communicate with the enterprise module 18E (also on the enterprise server 24). The communications between the control module 20A and the enterprise module 18E can be understood as proceeding via a first connection or channel (or virtual channel) 36A while the communications between the control module 20D and the enterprise module 18C can be understood as proceeding via a second connection or channel (or virtual channel) 36B. As shown, each of the channels 36A and 36B proceeds via each of the ICB 28, the bridge 32 and the ESB 30. The establishment of the channels 36A, 36B particularly is facilitated by the bridge 32. Essentially, the bridge 32 operates as a router to establish each of the channel 36A, 36B between a selected control module and a selected enterprise module, such that messages can be communicated in a point-to-point manner between the modules.

Bridged messaging between modules in the enterprise and control domains is facilitated by several factors. Some of these, such as the use of a common interface (or interfaces) for the modules, and/or the use of common instructions by the control modules (e.g., the use of send (SEND) and receive (RECV) instructions), are described in further detail below. In at least some embodiments, the communication system 12 employs a service oriented architecture (SOA) which relies on a common service description language employed by the modules, and/or an event driven architecture (EDA), where events and alarms in real time can be noted and acted upon. With respect to the use of common service description documents (that is, documents using a common service description language such as a version of WSDL, e.g., WSDL 2.0), such documents describe available services of the modules. With respect to the system 10 of FIG. 1, one or more of such documents pertaining to each of the respective modules 18A-18E and 20A-20D can be stored in the directory 14 when each respective module is deployed to the system 10 (more particularly when each respective module is deployed to its respective execution framework and connected to the MSB 16).

More particularly, each service description document pertaining to a given module can include a listing of available services of that module, a module interface type including identification of interface elements of that module, a protocol used to communicate with that module and its interface, and a module address at which where services of that module can be accessed by other modules. Such service description documents can be generated or developed in various manners, including by users through the use of a set of development and configuration tools available for creating such documents. Upon receiving service description documents pertaining to the modules 18A-18E and 20A-20D of the system 10, the directory 14 renders those documents discoverable by all of the modules that are part of the system 10 and in contact with the MSB 16. In this manner, the services of each given one of the modules 18A-18E and 20A-20D become known (or can become known) and are available for use by others of those modules. More particularly, the directory 14 publishes the service description documents and thereby allows for the accessing of those documents via the MSB 16.

Although in some embodiments publication of the service description documents by the directory 14 can be automatic or periodic, in the present embodiment the publication of such documents by the directory occurs in response to search requests or inquiries made by the modules 18A-18E and 20A-20D to the directory. For example, the directory 14 can be or include a hierarchical structure of data descriptors and references that the modules can search and read. Assuming such a structure, the directory 14 allows the modules 18A-18E and 20A-20D to discover registered modules (e.g., to discover one another). In this regard, the directory receives search inquiries from inquiring modules in which various types of searching criteria are specified, such as a type of module interface or a location in an organizational hierarchy, and in response provides relevant service description documents pertaining to (and identifying) ones of the modules that satisfy the searching criteria, and/or related data descriptors or references or other information. In addition to such publishing and related search services, it should further be noted that the directory 14 is also able to provide other directory services such as advertising or location services.

As noted above, the bridge 32 between the ESB 30 and the ICB 28 operates to automatically provide channels between modules connected to different ones of the ESB and ICB as illustrated in FIG. 3. A user does not directly configure the bridge 32, but rather the bridge 32 is automatically configured based on the service descriptions of known modules and the discovery of the physical locations (addresses) of those modules, which is information stored in the directory 14 in conjunction with the service description documents. Although only one bridge 32 is shown in FIG. 3, multiple bridges or multiple bridge instances can exist for a particular system 12 to provide multiple channels and thereby effectively bridge all desired communications (e.g., the channels 36A and 36B of FIG. 3 can respectively be provided by two different bridge instances), and the MSB 16 can provide automatic balancing for applications when multiple bridges or bridge instances are used. Although a user does not directly or control operation of the bridge 32, a user can observe a bridge configuration and change it if needed. Among other things, the MSB 16 provides bridge configuration options that permit a user to restrict communication between various modules as needed. Thus, in addition to serving as a router, the bridge 32 can also in some circumstances serve as a firewall between various modules of the control and enterprise domains.

In at least some embodiments, the MSB 16 uses queues and topics to support message exchange among modules and can include a queuing mechanism to buffer requests and responses from multiple modules. More particularly, in such embodiments the MSB 16 defines a message (or event) producer as a module sending a message and a message (or event) consumer as a module receiving a message. Any given module can be a message producer, a message consumer, or both. Producers and consumers are not directly tied to each other, instead, they are connected to each other through channels (e.g., the channels 36A, 36B of FIG. 3) via the bridge 32, which can be classified as point-to-point channels or publish/subscribe channels. Point-to-point channels can also be referred to as queues, while publish/subscribe channels can be referred to as topics. Depending upon the embodiment, topic hierarchy and dynamic topic creation can also be supported by the bridge 32 (and the MSB 16 generally). In publish/subscribe channels, the method consumers typically subscribe to events or event categories, while method producers publish events (or event categories).

Figure 4:
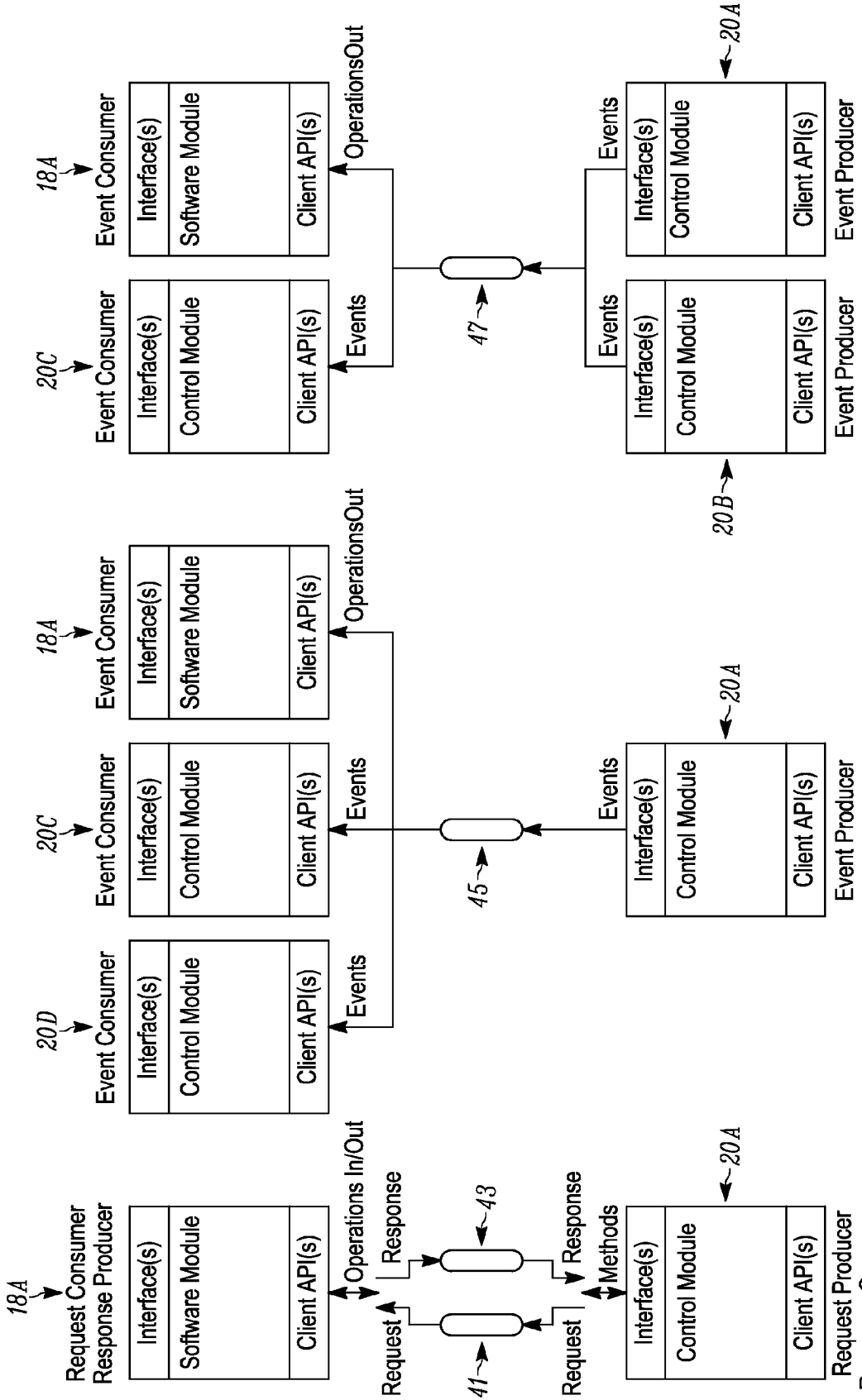
FIGS. 4A-4C are schematic diagrams illustrating exemplary types of messaging communications among modules of the industrial automation system of FIG. 1.

Referring to FIGS. 4A-4C, exemplary channels of both types are illustrated schematically. As illustrated particularly by FIG. 4A, in the point-to point model, only one message consumer can receive a message that is sent to a queue. Thus, in FIG. 4A the control module 20A of FIG. 1 is shown to be a message producer that sends a request message via a first channel 41 to a single one of the enterprise modules, namely, the enterprise module 18A. To illustrate that any given module can both be a message producer and a message consumer, FIG. 4A further shows that the enterprise module 18A upon receiving the request message generates a response message that is sent via a second channel 43 back to the control module 20A. It should further be noted that, in regards to the point-to-point model of communications, queues can in some circumstances be configured to be "persistent." In such circumstances, if a message consumer is not able to process a message immediately, the message stays in the queue until the consumer is able to retrieve that message (e.g., switches to an operational state in which the module is able to receive messages generally).

Turning to FIGS. 4B and 4C, in the publish/subscribe model, multiple consumers can subscribe to a topic and simultaneously (or substantially simultaneously) receive a message or messages from one or possibly more than one message consumer. Referring particularly to FIG. 4B, the control module 20A is now shown to be a message (or event) producer that sends a message on a third channel 45 by publishing that topic. In this example, not only the enterprise module 18A of FIG. 1 but also two additional modules, namely, the control modules 20C and 20D, have subscribed to the topic and are connected via the third channel 45 to the control module 20A, and consequently each of those subscriber modules receives a copy of the message. It should be understood that, as discussed above, the control modules 20C and 20D are capable of communicating with the control module 20A without involvement by the bridge 32. Thus, in this example, the channel 45 is representative of both communication of the topic via each of the ICB 28, bridge 32, and ESB 30 from the control module 20A to the enterprise module 18A, as well as representative of communication of the topic via only the ICB 28 from the control module 20A to the control modules 20C and 20D.

As for FIG. 4C, in that example, messages are sent by each of the control module 20A and also the control module 20B via a fourth channel 47 in relation to a given topic. Additionally in this example both the enterprise module 18A and also the control module 20C are subscribed to that given topic and thus connected to the fourth channel 47, each of those modules receives the messages from the control modules 20A and 20B. As with FIG. 4B, the fourth channel 47 is representative of both communications involving the bridge 32 (that is, between the control modules 20A, 20B and the enterprise module 18A) as well as communications not involving the bridge (that is, between the control modules 20A, 20B and the control module 20C). Although in FIGS. 4B and 4C the control modules are shown to be the message producers and the enterprise modules are shown to be the message consumers, in other circumstances or embodiments the roles of these modules can be reversed such that is the control modules that are the message consumers and the enterprise modules are the message producers. Also, it should be understood that, while in FIGS. 4B and 4C particularly exemplary combinations of modules are shown to be subscribed to and/or (and particularly with respect to FIG. 4C) sending messages, other combinations are possible depending upon the embodiment or circumstance. For example, in another circumstance multiple enterprise modules (rather than merely a single enterprise module) are subscribed to a given topic and thus multiple such enterprise modules receive such published messages.

Figure 5:
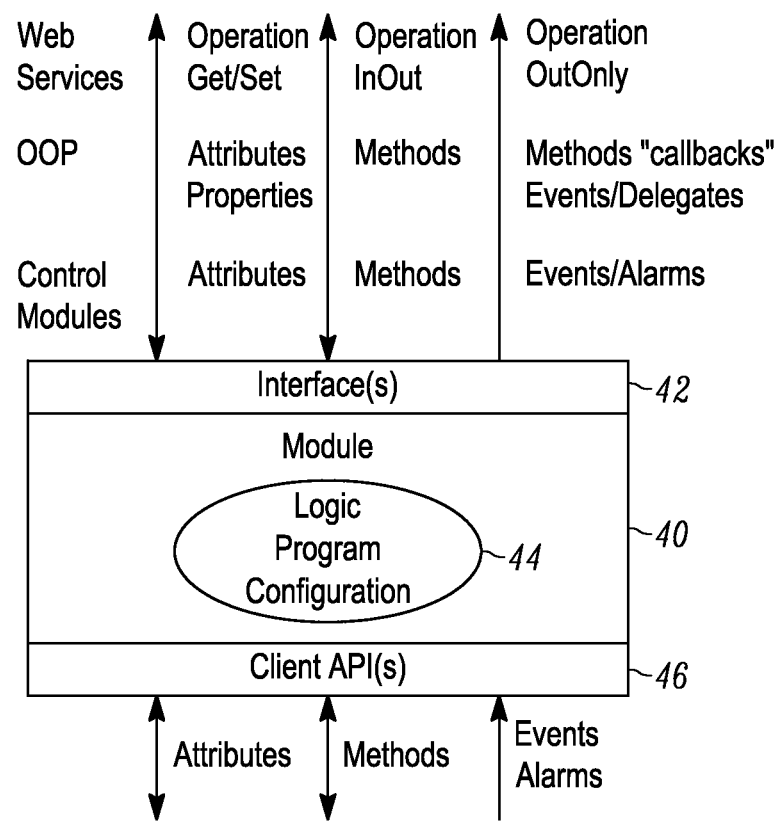
FIG. 5 is a schematic diagram showing in greater detail various components of an exemplary module representative of the modules of the industrial automation system of FIG. 1.

As mentioned above, successful bridged messaging between modules in the enterprise and control domains is facilitated by the use of modules that share in common one or more defined interfaces. The use of shared, defined interfaces makes it possible to develop modules or applications that are able to access or be accessed by one another via the defined interface configuration. Referring now to FIG. 5, an exemplary module 40 is shown that is representative of each of the enterprise modules 18A-18E and control modules 20A-20D of FIG. 1 in terms of illustrating exemplary components including exemplary interfaces found in each of those modules. As shown, the module 40 includes, in addition to logic, program, and/or configuration information 44, a first interface (or set of interfaces) 42 by which the module 40 can be accessed by other modules of the same type, as well as a second interface that is a client application programming interface (API) 46 that can be used by the module 40 to access and interact with other modules of the same type. The interfaces 42, 46 (particularly the interface 42) support generic semantics, and facilitate communication of data between modules particularly due to the defining (in each module) one or more common interface elements.

As further shown in FIG. 5, the first interface 42 is based on defined interface elements that include attributes, methods, and events and alarms. In this regard, an attribute is a tag that can be read and written, and can represent module input and output data that can be externally visible to other modules and tools. Further, each attribute can have several policies associated with it which specify purpose and access rules for that attribute. For example, an attribute can have access rules which apply either internally or externally, or can have various security settings, such that defined groups of modules can read and/or write the attribute. Assuming such access rules are present in a given module, when another (requesting) module attempts to access one or more attributes of the given (source) module, the MSB 16 is programmed to check the attribute policies of the given module and ensure that the other module satisfies the attribute policies.

By comparison, a method provides functionality or a service that is implemented by module logic and accessible externally by other modules. Typically a method can be called by other modules, requires one or more input parameters to be provided for such calls to be successful and, assuming the calls are successful, in response generates one or more output parameters. A method call can be represented in the messaging infrastructure as a request message from a module carrying all the method input parameters. The called (or source) module sends back to the method calling (or requesting) module the method output parameters or error information if the method call was not successful. A queuing mechanism enabling the buffering of multiple requests and responses can also be provided. Additionally, for security purposes, users can configure method access rules or policies for each module similar to the attribute access policies described above. The MSB 16 is programmed to check the policies before allowing for the calling of a particular method and it allows access to the method only when the request complies with all policy settings.

As for events and alarms, these are occurrences that can be sent and received. More particularly, an event is an asynchronous occurrence that is detected by one module and can be distributed to one or more other modules. An alarm is a special version of an event typically representing some urgent or problematic situation that is detected and requires special attention, and has an associated state machine and can take on various states, such as being active or inactive or acknowledged or unacknowledged. Event and alarm types, which are predetermined sets of events and alarms, can be defined to allow specific modules to interact in a predefined manner. For example, if a manufacturing module publishes a standard "Material Consume" event, the material tracking software application module can consume and process the event without additional configuration. Custom event and alarm types can also be defined. Specific execution frameworks can also define system level events and alarms that are related to their functionality. For example, a Logix execution framework (that is, an execution framework involving/suitable for implementation on a Logix controller as available from Rockwell Automation of Milwaukee, Wis.) can define event and alarm types such as major faults, minor faults, mode changes, and new module deployed. In a similar manner, an application server execution framework can define event and alarm types such as new module deployed, and unhandled exception captured. Additionally, events and alarms can be grouped into categories. Typically, an event or alarm category can include multiple event types or alarm types. For example, a diagnostic event category can be defined that includes all the diagnostic events that a system generates. Each event and alarm can be associated with one or multiple categories. A system can include a predefined set of standard categories, or custom categories can also be defined.

Module developers can program modules to subscribe to one or more selected categories, one or more selected types, and/or one or more specifically selected events or alarms. Also, in some embodiments the MSB 16 is able to provide APIs to one or more of the modules (such as API 46 of FIG. 5) that allow each such module to subscribe to selected events and alarms of one or more of the other modules, to selected event and alarm types (typically in some sub-area of the organizational model such as "subscribe to all material consume events in Line 1 area"), and/or to selected event and alarm categories (also typically in some sub-area of the organizational model).

In general, the characteristics of the interface elements of a given module will vary depending upon the embodiment. Indeed, a module developer can take into account a variety of considerations in designing an interface for a given module including, for example, the expected functionality of a given module and/or the type of other (external) modules with which the given module is expected to interact. Based upon such considerations, the given module can be designed to include one or more of the aforementioned interface elements (or possibly others), and/or can be designed to include specific policies for interface access. Also, modules can be developed and deployed for different execution frameworks, such as a Logix controller framework, a .Net framework, or a Java framework. Although a module for any given execution framework will often entail methods, attributes, and events and alarms, each execution framework can use different terms and patterns for these interface elements, such as those in the following table:

| Messaging | Control Module | Object Oriented Programming (COM, .Net, JAVA) | WSDL (Web Services Descriptive Language) |
|---|---|---|---|
| Methods Attributes Events/Alarms | Methods Attributes Events/Alarms | Methods Attributes/Properties Method "callbacks" Events/Delegates | Operation InOut Operation Get/Set Operation OutOnly |

In at least some embodiments, a given module (or modules) is developed and deployed for an execution framework in a manner that particularly allows other (remote) modules to read and write attribute values from and to that given module, and/or that allows for the given module to achieve periodic updating of attributes. In some such embodiments, the communication system 12 can periodically send values of all periodically-updated attributes to other corresponding modules consuming those attributes. The refresh frequency for periodically-updated attributes can be set by a module developer implementing the given module with an interface that supports periodically-updated attributes, or by a system integrator deploying the given module. To the extent that a given module uses (or consumes) periodically-updated attributes of another module, the given module does not need to access the other module, but rather is able to simply use the last value provided by the communication system 12, which amounts to synchronous communication from the point of view of the given (consuming) module. Periodically-updated attributes can have a data quality parameter, so a consuming module can appropriately handle a situation in which a consumed attribute has poor quality (e.g., when an attribute value has not been refreshed as expected).

Given a system in which each enterprise module and control module (such as the enterprise modules 18A-18E and control modules 20A-20D of FIG. 1) has the interface components of the exemplary module 40 of FIG. 5, those modules can intercommunicate in various manners via the MSB 16 as shown in FIGS. 6A-6D. In facilitating such communications, the MSB 16 typically uses all of the information regarding the definition(s) of the interface(s) of the modules when initiating communication among modules, as well as when routing and delivering messages during system runtime. Among other things, the MSB 16 is in communication with the directory 14 and uses the information in the service description documents to connect modules and route their messages. More particularly, the MSB 16 uses the common service description language documents that describe the available services of the connected modules to facilitate messaging between modules running in different execution frameworks. Further, the MSB 16 interconnects all the modules deployed in the system 10 with respect to their policies, and does not force limitations or restrictions on supported module communication or messaging scenarios.

Figure 6A:
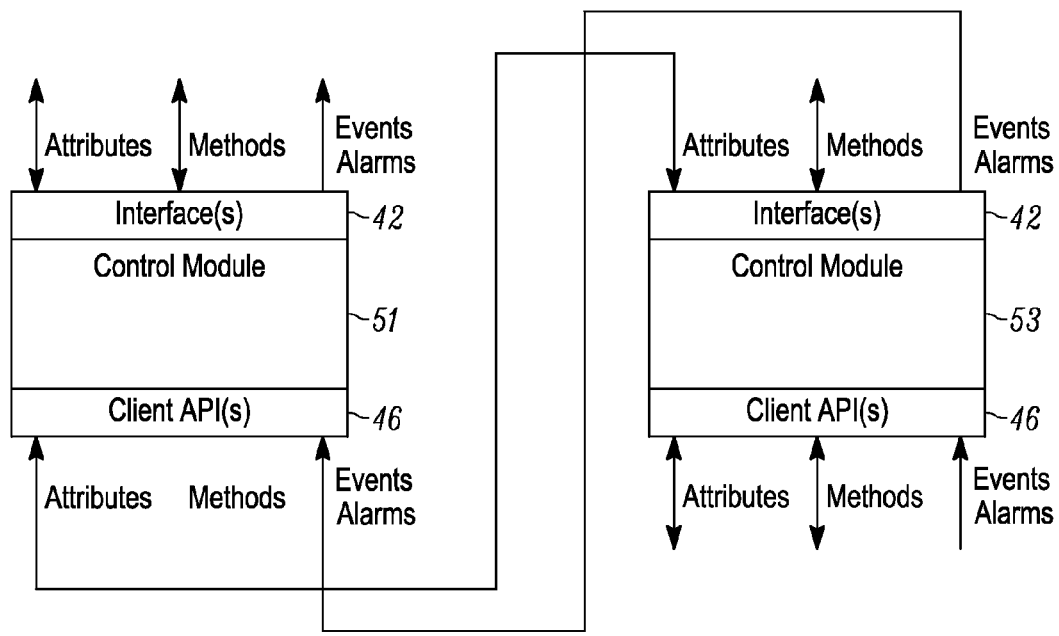
FIGS. 6A-6E are schematic illustrations of various module communication scenarios.
Figure 6B:
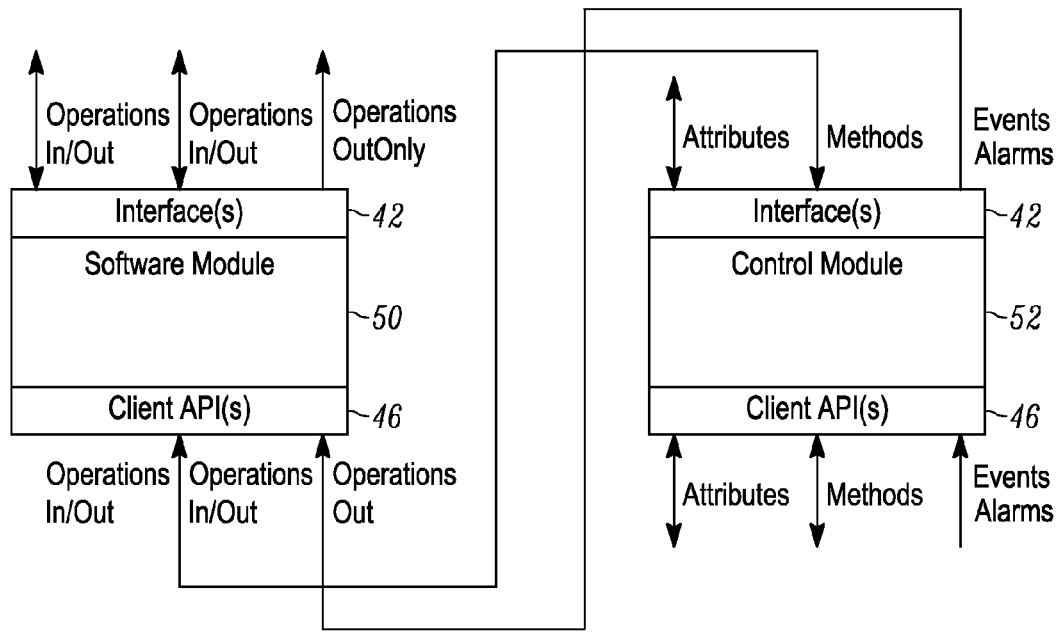
Figure 6C:
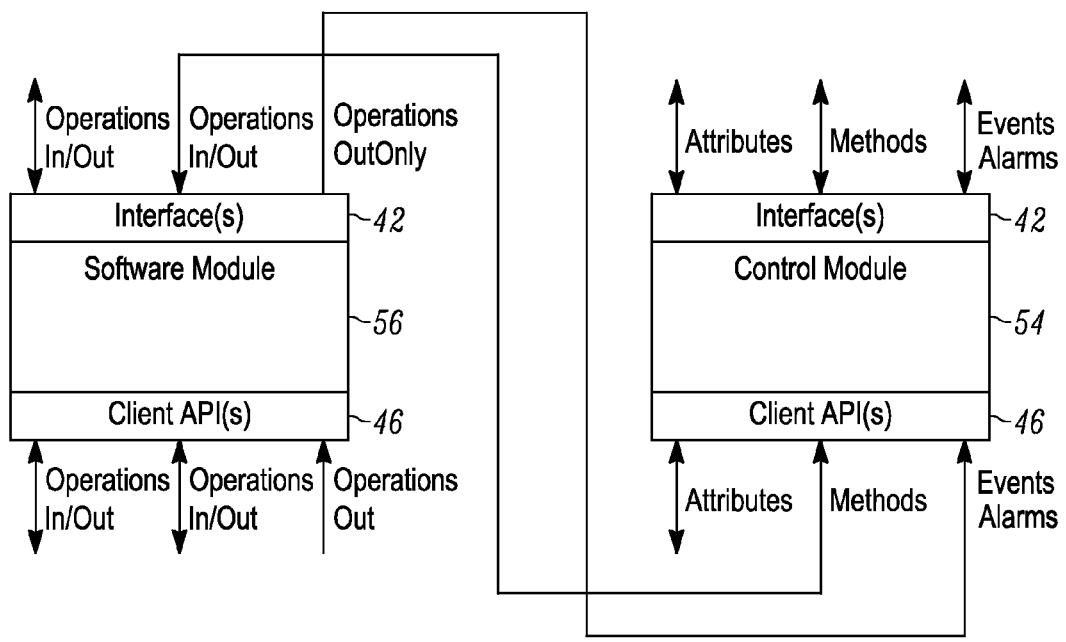
Figure 6D:
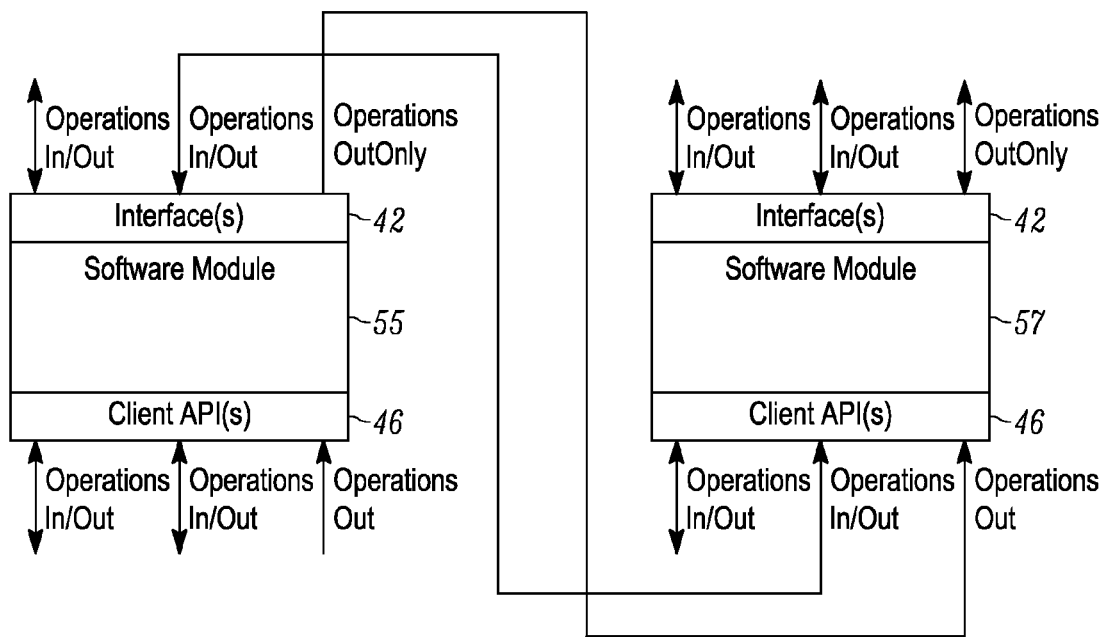
Figure 6E:
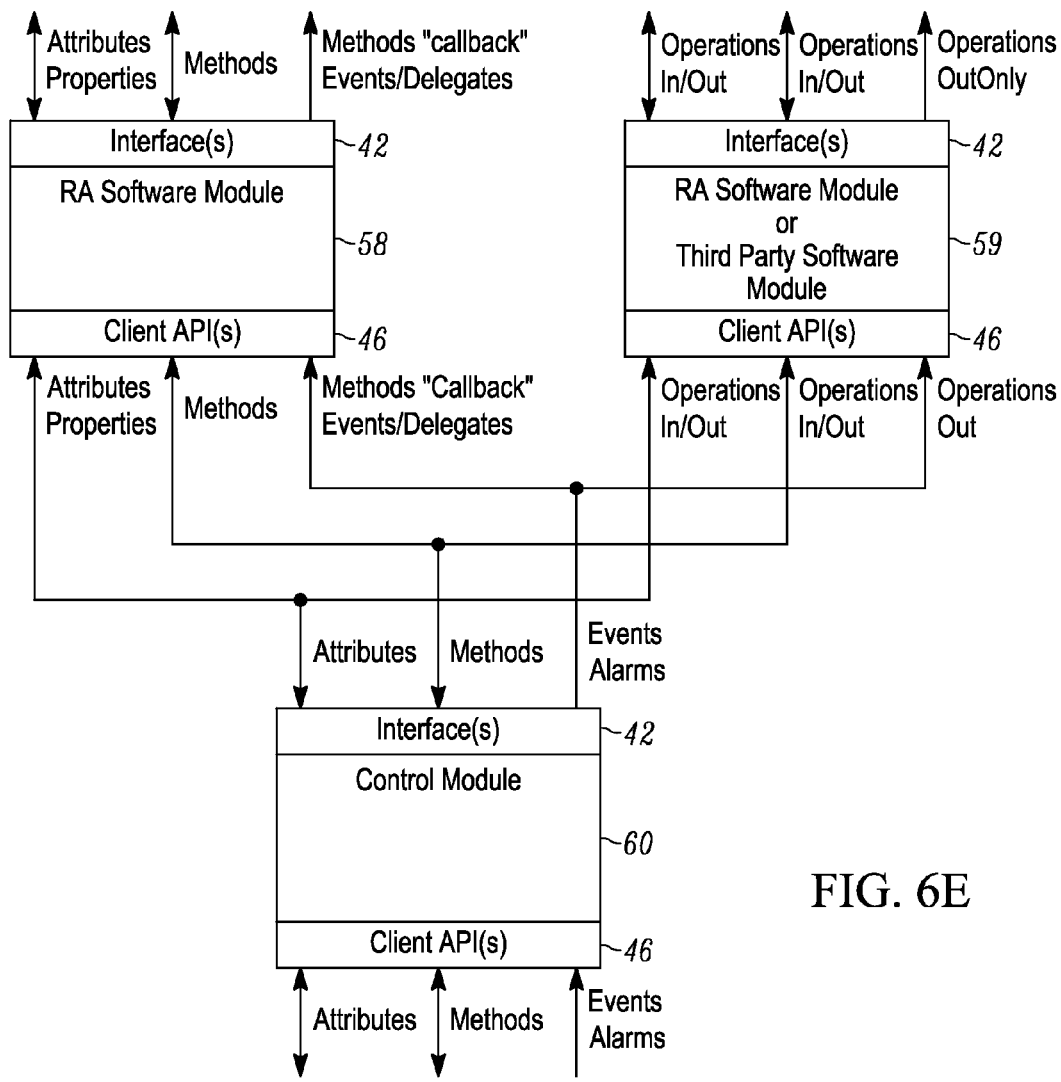

As shown in FIGS. 6A-6E, the MSB 16 facilitates all types of interconnections between control and enterprise modules such as the control modules 20A-20D and enterprise modules 18A-18E. Examples of the different scenarios are illustrated in respective FIGS. 6A-6E in a schematic manner such that the MSB 16 is not explicitly shown. With respect to FIG. 6A in particular, two control modules 51 and 53 are shown to be in communication while, by comparison, in FIG. 6D, two enterprise modules 55 and 57 are shown to be in communication. In contrast, FIG. 6B illustrates an enterprise (or software application) module 50 communicating to a control module 52, while FIG. 6C illustrates a reverse configuration in which a control module 54 is communicating to an enterprise module 56. Further, FIG. 6E illustrates an exemplary messaging scenario in which multiple modules of one type (in this example, first and second enterprise modules 58 and 59) are in contact with module(s) of another type (in this example, a single control module 60). In each of these illustrations, the module initiating communications does so by sending commands/requests from its respective client API(s) 46 to the interface(s) 42 of the other module with which it is communicating. It should be noted that, although the API(s) 46 and interface(s) 42 are shown in each of FIGS. 6A-6E, it should not be assumed that the exact interface elements are identical for each of the modules.

More particularly with respect to FIG. 6B, the enterprise module 50 is shown to be operating to load a recipe to a control module 52. In this example, the client API 46 of the enterprise module 50, via an Operations In/Out interface element, is in communication with a methods interface element of the interface(s) 42 of the control module 52. Additionally, the enterprise module 50 has an Operations Out interface element of the client API 46 that is in communication with an events and alarms interface element of the interface(s) 42 of the control module 52. By comparison, FIG. 6C illustrates exemplary communications in which the control module 54 is requesting an E-signature for operation approval from the enterprise module 56. In that example, the client API 46 of control module 54, via a methods interface element, is in communication with an Operations In/Out interface element of the interface(s) 42 of the enterprise module 56. Additionally, an events and alarms interface element of the client API 46 is in communication with an Operation Out Only interface element of the interface(s) 42 of the enterprise module 56. Additionally, FIG. 6E particularly illustrates in schematic fashion one messaging example where the two enterprise modules 58 and 59 use their respective client APIs 46 to access attributes and methods of the interface(s) 42 of a control module 60, and where both of the enterprise modules are subscribed to events and alarms of the selected control module 60.

Numerous other types of message exchanges in addition to the exemplary scenarios shown in FIGS. 6A-6E are also possible depending upon the embodiment. For example, in some embodiments the message exchanges that are supported include synchronous transactions between control modules for data exchange. Further, a control module can request a web service from another module (which is acting like a web server) and obtain a result back into the control module, or a control module can respond to a web service request from another module (act like a web server) and provide data to the requestor via the web. JDBC (Java database connectivity) transactions are also supported in some embodiments. For example, a control module can perform a database query and obtain a result, or can perform a database insert/update operation in response to a request. Further, in some embodiments message queue (MQ) messaging (a message oriented middleware) is supported, where a control module can provide a MQ transaction to a broker, or can subscribe to a MQ transaction from a broker. MQ is available on a large number of platforms (both IBM and non-IBM). Support for other IT oriented protocols such JMS, Net Weaver, TCP/IP sockets, BEA web Logic is supported, as is ODBC, MSMQ, etc.

Figure 7:
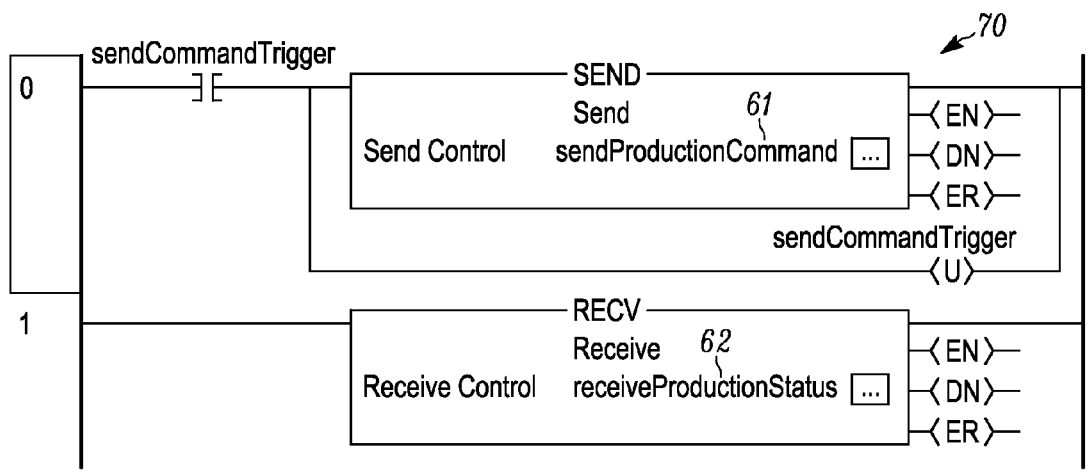
FIG. 7 is a schematic illustration of execution of exemplary SEND and RECV instructions represented in ladder logic.

As mentioned above, bridged messaging between modules in the enterprise and control domains is also facilitated by the use of common instructions by the control modules. In at least some embodiments, these common instructions can take the form of SEND (send) instructions that cause the sending of data to one or more target(s) (e.g., one or more other modules) and RECV (receive) instructions that cause the receiving of data from one or more source(s) (again, e.g., one or more other modules). The SEND instructions and RECV instructions typically are in the form of messages, including service invocations and responses, and can in some circumstances be generated by method calls as described above (which, as described above, involve input parameters and output parameters). Referring particularly to FIG. 7, operation of exemplary instructions of these types in ladder logic 70 is illustrated schematically. As shown, the ladder logic 70 represents execution of an exemplary SEND instruction 61 (which is termed "sendProductionCommand") and an exemplary RECV instruction 62 (which is termed "receiveProductionStatus"). The data that is sent or received due to the operation of the SEND and RECV instructions can be of arbitrary size, and large data sizes can be accommodated using known fragmentation and reassembly techniques. Further, the transferred data can be any data type, such as a structure, or a user defined data type. In at least some embodiments, the data to be sent is captured synchronously by the SEND instruction, providing guaranteed data consistency.

Figures 8A, 8B:
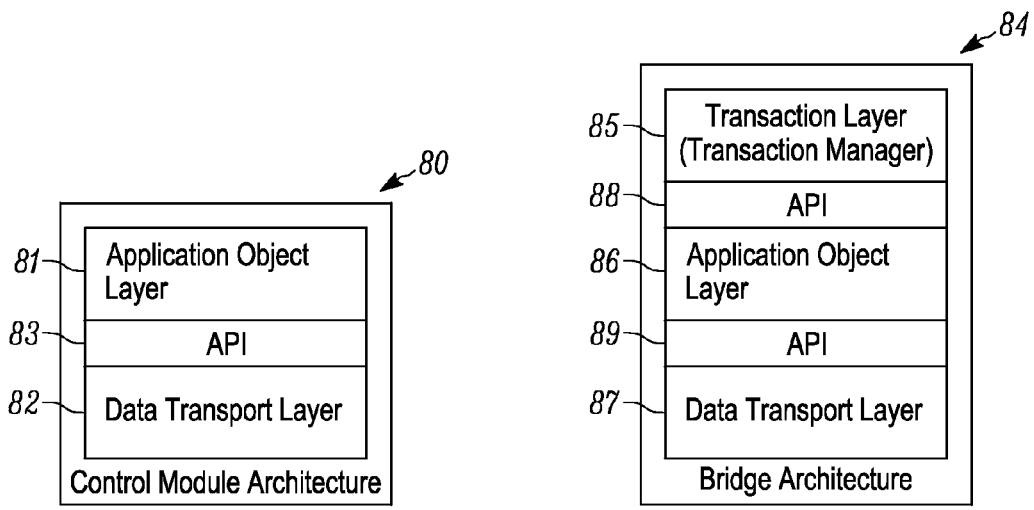
FIGS. 8A and 8B are, respectively, schematic illustrations of exemplary architectures of, respectively, one or more of the modules and the bridge of the industrial automation system of FIG. 1 that can be employed to support message exchange.

To support messaging, particularly messaging involving SEND and RECV instructions, in the present embodiment at least some of the modules 20A-20D and 18A-18E (particularly the control modules 20A-20D) and at least some portions of the communication system 12 (particularly the bridge 32) have particular transaction or messaging architectures. Referring to FIG. 8A, in one exemplary embodiment, each control module such as the control modules 20A-20D has a two-layer architecture 80 that includes an application object layer 81 and a data transport layer 82 that are in communication with one another by way of an intermediating API 83. Additionally, as shown in FIG. 8B, in one exemplary embodiment, the bridge 32 has a three-layer transaction architecture 84 that includes a transaction layer 85, an application object layer 86, and a data transport layer 87, where the transaction layer and application object layer are in communication with one another by way of an intermediating API 88 and the application object layer and the data transport layer are in communication with one another by way of another intermediating API 89. The transaction layer 85 of FIG. 8B can also be referred to as a transaction manager. As discussed further below, the application object layers 81, 86 can serve various purposes. In at least some embodiments, the application object layers 81, 86 can include application logic (e.g., ladder logic programming), and/or are able to store (or govern the storing of) information required for data delivery, including data that is to be sent in messages and/or data that has been received as a result of messaging transactions. Also, in at least some embodiments, the bridge 32 is implemented by way of a Java application.

Figure 9:
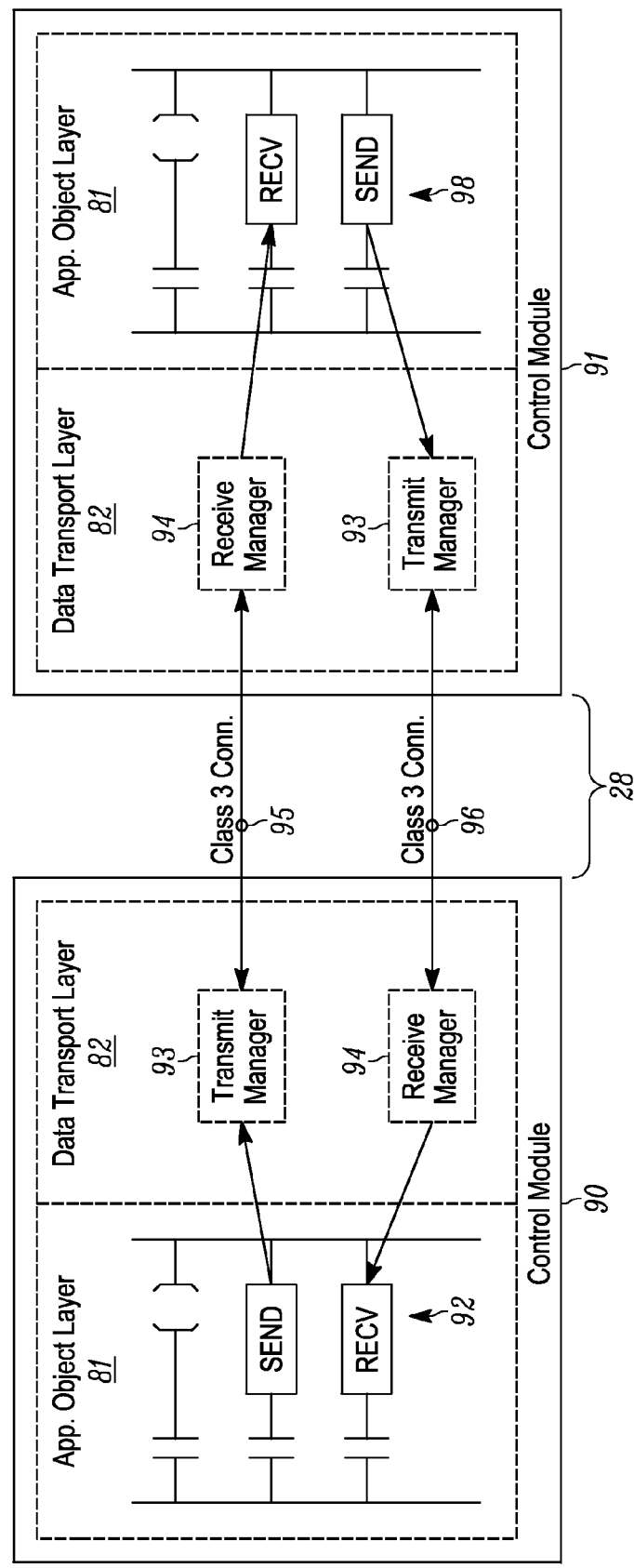
FIG. 9 is a schematic illustration of message exchange between two modules of the same type.

Typically, message exchanges involve a series of actions in which a message is sent by a source module, the message is received and processed by a target module, a response to the message is sent back to the source by the target, and the response is received by the source. In this manner, message exchanges typically are two-direction transactions rather than merely single-direction transactions in which data is merely provided from one module to another module. FIG. 9 illustrates schematically such two-directional transactions that occur during a message exchange. More particularly, in FIG. 9, an exemplary message exchange is shown to occur between a source module 90 that is a control module and a target module 92 that is also a control module. As shown, each of the source module 90 and target module 91 has a respective one of the application object layers 81 shown in FIG. 8A and a respective one of the data transport layers 82 also shown in FIG. 8A (APIs corresponding to the API 83 of FIG. 8A, although typically also' present modules such as the source module and target module, have been omitted from FIG. 9 for simplicity).

Further as shown, the application object layers 81 are where, in each of the modules 90 and 91 respectively, there exists ladder logic programming for initiating SEND and RECV instructions. In the present example, although the same application object layer 81 is shown to be present in each of the modules 90, 91, this is meant to signify that the same type of application object layer is present in each module, but should not be interpreted as indicating that the exact ladder logic programming in each module is identical. Indeed, the ladder logic programming 92 of the source module 90 is shown to have SEND and RECV rungs that are opposite in order relative to those of the ladder logic programming 98 of the target module 91 and, depending upon the embodiment, the ladder logic programming of modules such as the modules 90, 91 can take a variety of other forms as well. As for the data transport layers 82 for each of the modules 90, 91, each of the data transport layers includes a respective transmit manager 93 and a respective receive manager 94. The transmit managers 93 and receive managers 94 establish and maintain connections between the modules 90, 91 via the communication system 12 and, more particularly (since in the present example both of the modules 90, 91 are control modules), via the ICB 28. The data transport layers 82 in particular are capable of addressing data fragmentation and performing reassembly of data if the data is longer than one CIP packet size. The connections established via the ICB 28 can take a variety of forms including, for example, Class 3 connections as shown.

The two-dimensional transactions occurring during the message exchange are illustrated in FIG. 9 more particularly as follows. As shown, the message exchange is initiated when the ladder logic programming 92 of the source module 90 provides a SEND instruction that is received by the transmit manager 93 of the data transport layer 82 of that module. The initiation of a message transaction in this manner, as governed by the ladder logic programming 92, can involve selection of a particular message from among one or more possible messages of a set of messages that are in a queue or in within a set of topics. Upon the process being initiated, the transmit manager 93 in response sends data from the source module 90 via a first Class 3 connection 95 over the ICB 28 to the receive manager 94 of the data transport layer 82 of the target module 91. Upon receipt of the message (and associated data) at the receive manager 94 of the target module 91, that receive manager in turn sends a signal to the application object layer 81 of the target module in response to which the RECV is executed by the ladder logic 98 of that module. Once that occurs, then the ladder logic 98 provides an additional SEND instruction to the transmit manager 93 of the target module 91, in response to which that transmit manager sends a confirmation signal by way of a second Class 3 connection 96 over the ICB 28 to the receive manager 94 of the source module 90 indicating that the target module 91 has in fact received the data transmitted from the source module. Upon receiving the confirmation signal, the receive manager 94 in turn provides a signal to the application object layer 81 of the source module 90 in response to which the RECV instruction of the ladder logic 92 is executed.

The ladder logic programming 92, 98 in the source and target modules 90, 91 control the precise timing when the data should be captured for sending and when the data should be accepted by the receiver side. In the present embodiment, data being sent is captured when the SEND instruction is executed and received on the other side when the RECV instruction is executed, which makes the data transfer synchronous. Although the above description presumes that the signal returned via the second Class 3 connection 96 is a confirmation signal, this need not always be the case. Rather, in circumstances where the data transmitted from the source module 90 to the target module 91 is not properly communicated or received by the target module, the signal returned via the second Class 3 connection 96 can instead be indicative of a failure of the data communication, or of an abnormal operational state. The absence of the sending of a signal via the second Class 3 connection 96 following the sending of data via the first Class 3 connection 95 can also be interpreted by the source module 90 as indicative of a failure.

Although FIG. 9 shows each of the source module 90 and the target module 91 as having respective data transport layers 82 that each have only single respective transmit managers 93 and single respective receive managers 94, and as having application object layers 81 that only have single applications (ladder logic programming and/or other programs) operating therein, the present invention also envisions modules in which there are multiple applications operating simultaneously or substantially simultaneously within a single module. In at least some cases where there are multiple applications running, these applications can be considered as being supported within the same application object layer of the module. Further, when there are multiple applications running on a single module, typically there are generated within the data transport layer 82 multiple instances of the transmit manger 93 and the receive manager 94 that are respectively dedicated to the different applications. Operation in this manner, with multiple applications and multiple instances of transmit and receive managers, can result in multiple messaging transactions occurring between a given module and another module in the same manner as shown in FIG. 9.

Figure 10:
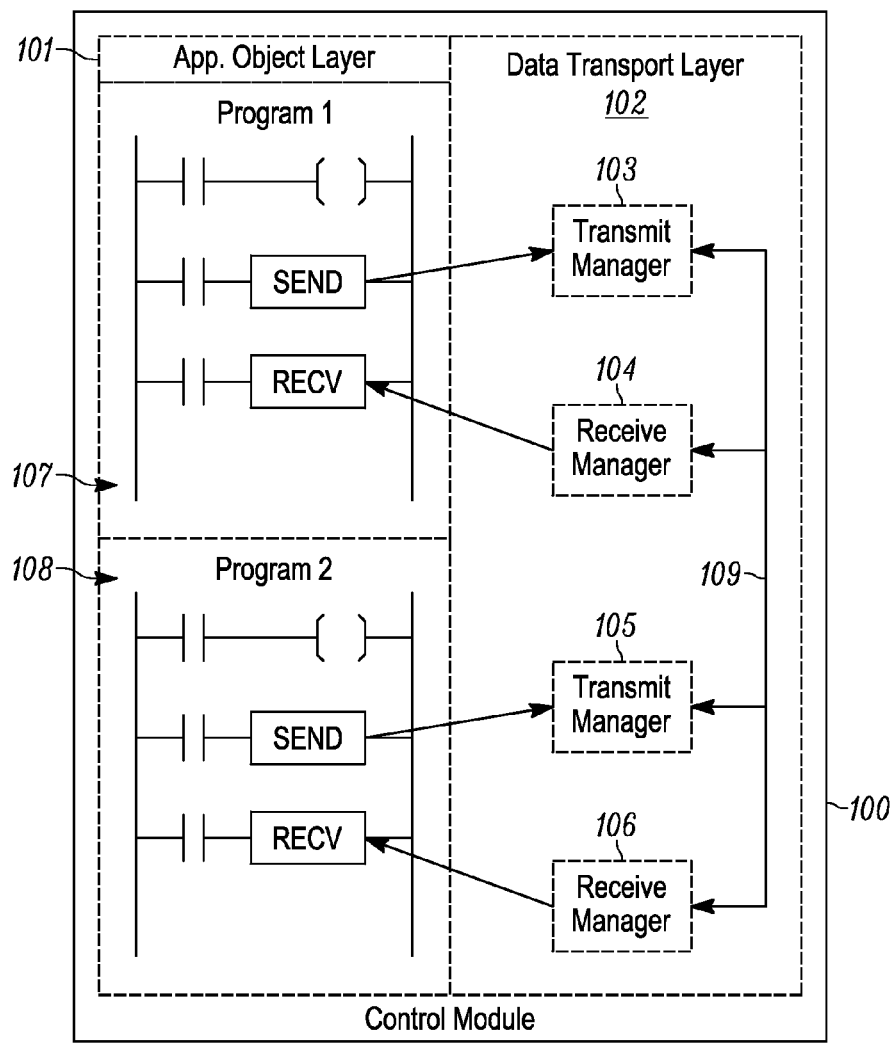
FIG. 10 is a schematic illustration of intra-module message exchange.

Additionally, it will be understood that, as shown in FIG. 10, the possibility of modules having multiple applications and multiple corresponding pairs of transmit and receive managers is also consistent with the concept of intra-module communications in which there are messaging transactions between the multiple applications via their multiple transmit and receive managers, without any involvement at all by the communication system 12 (or ICB 28). Thus, as shown in FIG. 10, a given module 100 (which in this example again is a control module) has an application object layer 101 that, while of the same type as the application object layer 81 discussed above, has both first ladder logic programming 107 and second ladder logic programming 108 (which, in the present example, are identical to the ladder logic programming 92 and ladder logic programming 98 shown in FIG. 9, respectively). Correspondingly, the data transport layer 102, while of the same type as the data transport layer 82 discussed above, in this example has both a first instance of a transmit manager 103 and a receive manager 104 that are dedicated to the first ladder logic programming 107 and a second instance of a transmit manager 105 and a receive manager 106 that are dedicated to the second ladder logic programming 108 (again, for simplicity, an API corresponding to the API 83 of FIG. 8A is omitted from FIG. 10). Given this arrangement, messaging communications occur between the first ladder logic programming 107 and the second ladder logic programming 108, as facilitated by their respective transmit and receive managers 103-107, as generally represented by a linkage 109, in a manner that is essentially identical to that discussed above with respect to FIG. 9 except insofar as the communications do not occur via any pathways external to the module 100 (that is, do not involve the communication system 12).

The above description with respect to FIGS. 9-10 is particularly pertinent to messaging exchanges that occur between modules of the same type (e.g., two of the control modules 20A-20D, or also possibly two of the enterprise modules 18A-18E) or intra-module communications (as discussed with respect to FIG. 10). Yet as discussed above, the present invention is also intended to encompass messaging transactions between different types of modules, for example, from one or more control modules and one or more enterprise modules (e.g., from one or more of the control modules 20A-20D to one or more of the enterprise modules 18A-18E), or vice-versa. In conducting such messaging exchanges, the messaging architecture of the communication system 12 and particularly the bridge 32 as discussed above with respect to FIG. 8B is also of relevance.

Figure 11:
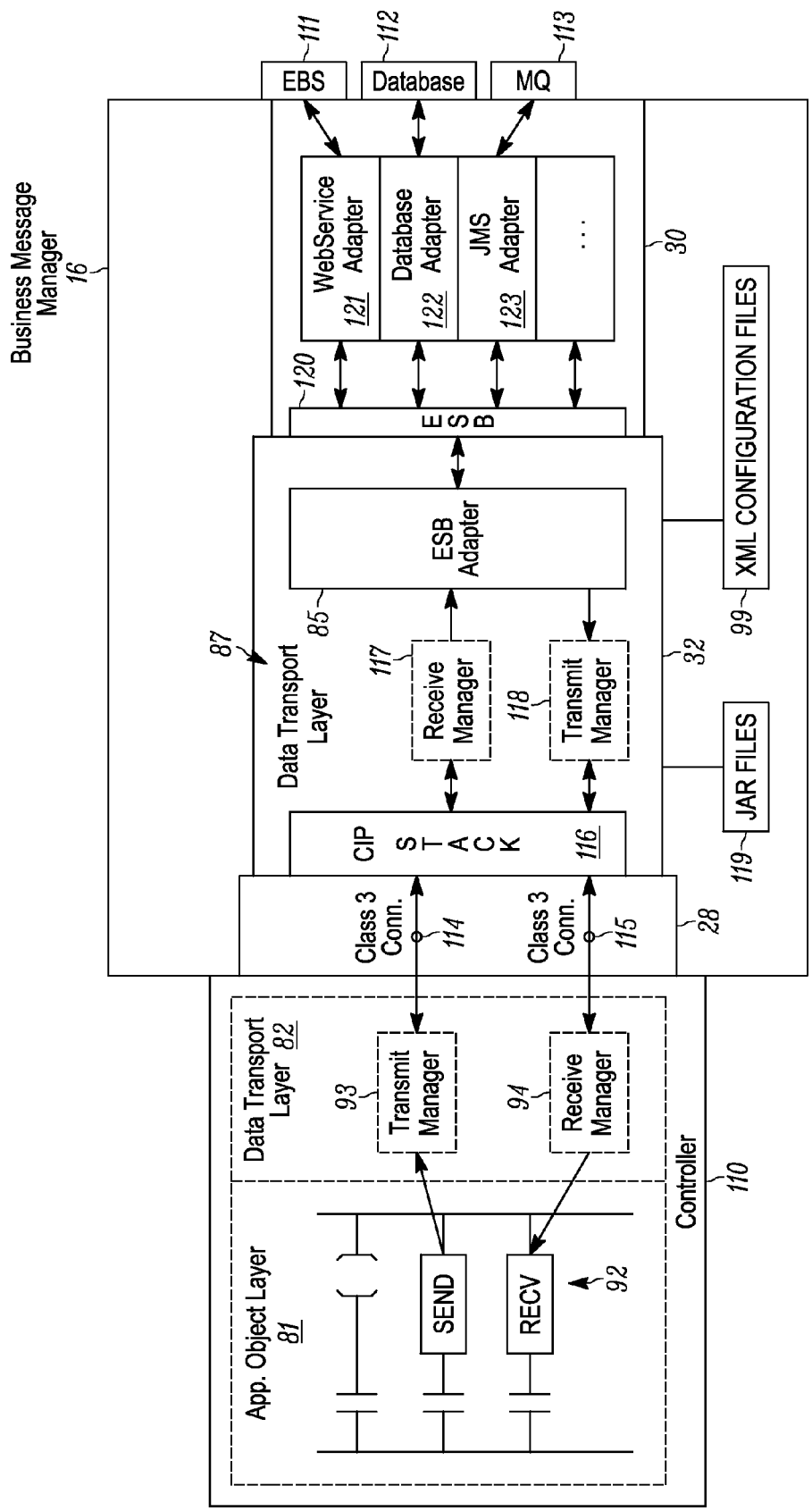
FIG. 11 is a schematic illustration of bridged message exchange between two different types of modules.

Turning to FIG. 11 in this regard, exemplary message exchanges between a control module 110 and first, second and third different types of enterprise modules 111, 112, and 113, respectively, are shown to be conducted via the MSB 16, which in the present context can also be referred to as a Business Message Manager (BMM). In the present example, the enterprise modules 111, 112, and 113 are respectively shown to be an Enterprise Business System (EBS) enterprise module, a database enterprise module (which can be representative of, for example, a database such as a structured query language (SQL) database having a database driver), and a MQ enterprise module. As discussed with reference to FIG. 1, the MSB 16 includes the ICB 28, the bridge 32, and the ESB 30. Further as shown in FIG. 11, the control module 110 in this example includes the same component parts as the control module 90 shown in detail in FIG. 9, namely, the application object layer 81 with the ladder logic programming 92 and the data transport layer 82 with the transmit manager 93 and the receive manager 94. As in FIG. 9, the transmit manager 93 and receive manager 94 of the data transport layer 82 of the control module 110 are in communication with the MSB 16 by way of first and second Class 3 connections over the ICB 28, which are shown in this example as connections 114 and 115, respectively. In contrast with FIG. 9, however, rather than being in communication with another control module via the ICB 28, in this embodiment the control module 110 instead is in communication with the enterprise module 111, 112, and 113 via the MSB 16.

As already noted, the MSB 16 includes the ICB 28, the bridge 32, and the ESB 30. The particular embodiment shown in FIG. 11 is particularly suitable for large applications that usually require an intermediate gateway personal computer (PC) or server where the ESB 30 is actually running. In terms of the operation of the MSB 16, the bridge 32 in particular allows for communications between the ESB 30 and the ICB 28. As shown, the bridge 32 has a messaging architecture that includes one of the data transport layers 87 and one of the transaction layers 85, which can also be referred to as a transaction manager or alternatively, as shown in FIG. 11, an ESB adapter (for simplicity of explanation, the APIs 88 and 89 and application object layer 86 shown in FIG. 8B as existing in between the data transport layer and the transaction layer are omitted from FIG. 11, albeit it should be understood that such components are typically also present in the bridge 32). Further in the present embodiment (although omitted from FIG. 8B), a CIP stack 116 is also provided as part of the bridge 32. The CIP stack 116 serves as an intermediary interface between the data transport layer 87 of the bridge 32 and the Class 3 connections 114, 115 associated with the ICB 28.

By virtue of the data transport layer 87 and the transaction layer 85 and also the CIP stack 116, the bridge 32 functions as a translator between the CIP network provided by the ICB 28 and the ESB 30 and thus facilitates messaging transactions between the control module 110 and the enterprise modules 111-113. The data transport layer 87 of the bridge 32, similar to the data transport layer 82 of the control module 110, has a receive manager 117 and a transmit manager 118. The receive manager 117 can be identical or similar in operation to the receive manager 94 of the data transport layer 82, while the transmit manager 118 can be identical or similar in operation to the transmit manager 93 of the data transport layer. Together with the transmit and receive managers 93, 94, the receive and transmit managers 117, 118 establish and maintain connections between the module 110 and the bridge 32 via the ICB 28 and the CIP stack 116. Further in the present embodiment, the bridge 32 uses one or both of XML based configuration files 99 and JAR files 119 to configure messages/message transactions (also, in some cases, WSDL-based files can be used for this purpose).

FIG. 11 further shows the ESB 30 as including both a primary bus section 120 and several adapters that in the present embodiment include first, second, and third adapters 121, 122, and 123. The primary bus section 120 is in communication with the transaction layer 85 of the bridge 32, and can be understood to include the aspects of the ESB 30 as are shown in FIG. 1 (including, for example, any of the binding 27A, 27B, 27D, 27E, and 27F as are appropriate). The first, second and third adapters 121, 122, and 123, respectively, further intermediate between the primary bus section 120 of the ESB 30 and the first, second, and third enterprise modules 111, 112, and 113, respectively. In the present embodiment, the first adapter 121 is a WebService adapter (e.g., in accordance with the Web Service Definition Language, WSDL) that allows for communications between the primary bus section 120 and the enterprise module 111 (which is a EBS enterprise module), the second adapter 122 is a database adapter that allows for communications between the primary bus section 120 and the enterprise module 112 (which is a database enterprise module), and the third adapter 123 is a JMS adapter that allows for communications between the primary bus section 120 and the enterprise module 113 (which is a MQ enterprise module), for example, by binding industrial protocol and JMS messaging. In the present embodiment, it is the transaction layer 85 of the bridge 32 that, upon analyzing a message received by the bridge, determine which of the adapters 121, 122, 123 is suitable for enabling further communication of the first message to the appropriate one of the enterprise-level module 111, 112, 113.

Notwithstanding the particular embodiment shown in FIG. 11, the present invention is intended to encompass other embodiments as well that are implemented in various forms. For example, while in FIG. 11 the three different types of enterprise modules 111, 112 and 113 are shown, it will be understood that the present invention is intended to encompass other embodiments as well in which there are communications involving more than one (or none) of the types of enterprise modules shown in FIG. 11, and/or other types of enterprise (or software) modules. Indeed, depending upon the embodiment, any arbitrary number of or types of enterprise (or other software) modules can be present. Additionally, just as the enterprise (or software) module(s) can vary depending upon the embodiment, also depending upon the embodiment the number and/or types of adapters present in the ESB 30 can also vary from the adapters 121, 122, and 123 shown in FIG. 11, in order to accommodate such differing enterprise (or software) module(s). Such adapters can in some embodiments allow the ESB 30 and the bridge 32 to form one or more standard interfaces suitable for facilitating communications with the enterprise modules 111-113 (and any other EBS, database, MQ, or other enterprise modules). Although not shown in FIG. 11, the ESB 30 can further be considered to encompass an internal control program that governs actuation of the specific adapters such as the adapters 121, 122 and 123.

Figure 12A:
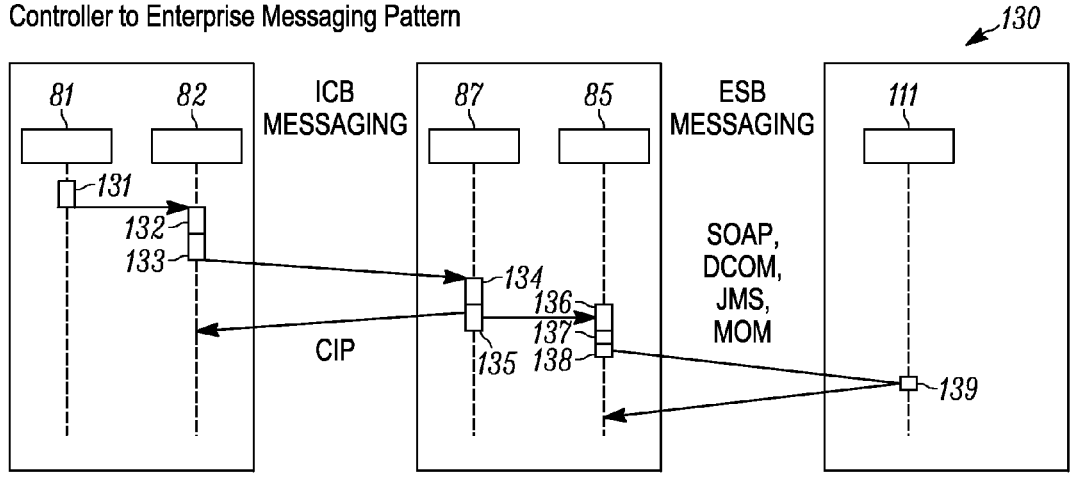
FIGS. 12A-12B are sequence diagrams illustrating exemplary message exchanges between the two different types of modules shown in FIG. 11, in accordance with at least one embodiment of the present invention.
Figure 12B:
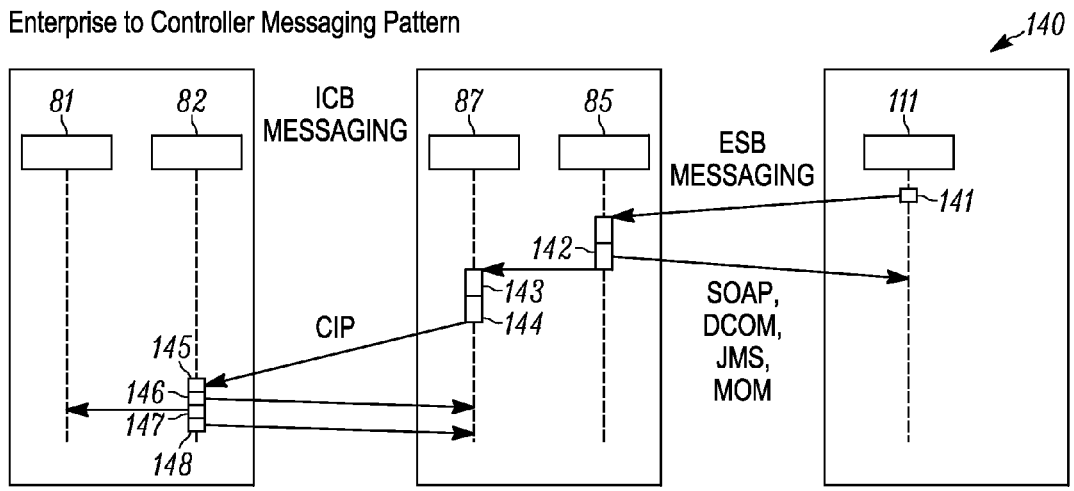

Turning to FIGS. 12A and 12B, sequence diagrams 130 and 140 are provided illustrating two exemplary messaging transactions between the control module 110 and the enterprise module 111 by way of the bridge 32 of FIG. 11. FIG. 12A in particular illustrates an exemplary messaging transaction in which a message is provided from the control module 110 to the enterprise module 111, for example, a message involving a data query by the control module for the enterprise module. As shown, the messaging transaction is initiated by the control module 110 by invocation of a SEND instruction by the application object layer 81, at a step 131. During (or as a result of) the invocation of the SEND instruction (which can be, for example, an IEC1131 instruction), data from tags specified in the SEND instruction are sampled synchronously, binary packed and placed into a Send backing tag buffer. The storing of the tag data into the tag buffer is performed by the data transport layer 82, and the tag buffer is part of (or associated with) the transmit manager 93 of that layer. A timestamp is also placed into the buffer and sent with the sampled data. Next, at a step 132, the transmit manager 93 of control module 110 takes the data from the send buffer, and the data is evaluated to determine if the data in the send buffer is bigger than a CIP packet size, and if so, then the transmit manager fragments the data (if not, then no fragmentation is performed). Further, at a step 133, the data is then sent via one or more messages or packets (and, where fragmentation has been performed, one or more message fragments) in CIP form via the Class 3 connection 114 via the ICB 28 to the bridge 32. Once all message(s)/packet(s) (and/or message fragments) have been successfully sent, then the transmit manager 93 indicates that data was sent to allow another message exchange to occur.

Next at a step 134, the receive manager 117 of the data transport layer 87 on the bridge 32 receives the data associated with the message, reassembles the data to the extent it is arriving in multiple packets, and stores the data in a receive buffer (not shown) that is part of (or associated with) the receive manager (in an alternate embodiment, the received data is stored in packet form and is only reassembled after being stored). Upon receiving the data, the transmit manager 118 of the bridge 32 sends back an indication of the successful receipt of the data at a step 135. More particularly, a "success" response can be sent back from the transmit manager 118 on the bridge 32 to the receive manager 94 on the data transport layer 82 of the control module 110 for every valid received packet, so as to inform the control module about the successful packet delivery. Alternatively (or in addition), another "success" response can be sent back from the transmit manager 118 to the receive manager 94 when all packets are successfully received by the receive manager 117 on the bridge 32. The message(s) sent back from the bridge 32 to the control module 110 in this regard can be considered receive messages (reflective of RECV instructions being executed at the bridge) not unlike those already discussed above in relation to FIG. 9.

Upon receiving these one or more "success" responses, the receive manager 94 of the data transport layer 82 sets the data delivery (.DD) status bit on the SEND backing tag indicating that the data has been successfully sent. Further, at a step 136, when all data from the control module 110 has been received by the bridge 32, the transaction layer 85 of the bridge 32 takes the data from the receive buffer and unpacks it. Further, at a step 137, the transaction is extracted and one of the adapters 120 is identified as being appropriate for allowing the transaction to proceed toward an intended one of the enterprise modules 111-113. In the present example, the intended recipient of the message is the ESB enterprise module 111, and consequently it is the WebService adapter 121 that is identified at the step 107. Next, at a step 138, the WebService adapter 121 identified at the step 107 is invoked such that the message is communicated via the ESB 30 to the intended recipient, which in this example is the ESB enterprise module 111 (the message communicated at this point can be considered to be the same as, or at least based upon, the original message received by the bridge 32 from the control module 110). Finally, at a step 139, when the ESB enterprise module 111 has finished the transaction, the transaction layer 85 notified. Although not shown, depending upon the embodiment, the above process can be modified or include additional aspects as well. For example, in one alternate embodiment, upon receiving a message at the bridge 32, the bridge performs each of a message queue (MQ) operation, a dispatch, and a method invocation, and then completes its operation in response to that message.

FIG. 12B shows a messaging transaction that is essentially the reverse that shown in FIG. 12A, in which a message is communicated from the ESB enterprise module 111 to the control module 110. As shown, at a step 141, a message from the ESB enterprise module 111 (e.g., a response to an earlier message received by the ESB enterprise module) is sent to the transaction layer 85, and as a result the transaction layer 85 places it into a send buffer (not shown). In at least some embodiments, the transaction layer 85 (and particularly that one of the adapters 120 used for communications with the ESB enterprise module 111, e.g., the WebService adapter 121) after receiving the message from the ESB enterprise module further sends a conformational message back to the ESB enterprise module confirming receipt of the message, at a step 142. Next, at a step 143, the transmit manager 118 of the data transport layer 87 of the bridge 32 takes the data from the send buffer. Upon obtaining the data from the send buffer, at a step 144 the transmit manager 118 further causes the data to be sent to the control module 110 via the CIP stack 116 and the Class 3 Connection 115 provided by the ICB 28.

Further, at a step 145, the receive manager 82 on the control module 110 receives the data packets and stores them into a receive buffer (not shown). Additionally, at a step 146, the transmit manager 93 of the control module 110 sends one or more confirmation signals back to the bridge 32 confirming receipt of each packet. These signals can be sent upon receipt of each packet and/or when all data packets have been received. The bridge 32 then sets the data delivery (.DD) status bit for the transaction. Next, at a step 147, the ladder logic programming 92 of the application object layer 81 of the control module 110 invokes the RECV instruction. The RECV instruction takes the binary data from the send buffer, unpacks it, and places the data into corresponding receive tags. Finally, at a step 148, the control module 110 at this time additionally sends back (by way of the transmit manager 93) an additional signal to the bridge 32 at this moment indicating that the RECV instruction was executed. The bridge 32, upon receiving such information, in turn sets a data processed (.DP) status bit for the transaction, at which point the messaging transaction is complete.

In at least some embodiments, messaging transactions involving control module 110, MSB 16/bridge 32 and an enterprise module such as the module 111 can particularly make use of headers and/or queues, and/or can be described in other terms. For example, in some such embodiments, the receive manager 117 at the step 134 also decodes a message header associated with the message data that is received. If a reply queue name is included in the message header, the bridge device 32 then creates a consumer to be able to receive a service response. Also, in some such embodiments, if the receive manager 117/bridge device 32 detects a destination queue name at the step 134 from the message header, it then encodes the message header and sends a service message to a destination queue within the bridge. Ultimately, the service message can further then be received by a service framework (e.g., one of the enterprise modules 111-113) and, upon the receiving of the service message, the service framework causes an appropriate service to be invoked and further causes a response message to be sent to a response queue of the bridge. The bridge 32, upon receiving the response message from the response queue decodes a further message header of the response message to find an industrial protocol message path. The bridge 32 then ultimately encodes an additional message header to be sent back to the control-level module 110.

It should be understood from the discussion above that any arbitrary number of messaging transactions can be conducted in the above-described manner involving the control module 110, MSB 16/bridge 32, and enterprise modules 111-113, and that the transmit and receive managers 93, 94, 117, 118 of the data transport layers 82, 87 are particularly suited for processing numerous messages. Further, notwithstanding the exemplary messaging transactions shown in FIGS. 12A-12B, a variety of other types of message transactions are also possible depending upon the embodiment. For example, using an appropriate adapter such as the WebService adapter 121, it is also possible in some embodiments to allow a control module such as the control module 110 to communicate with the EBS enterprise module 111 so as to request one or more of various web services (where the EBS enterprise module is acting as a web server) and receive a result, or to respond to a web service request (and thus act as if the control module itself were a web server). Additionally, JDBC transactions can be supported in some embodiments using a database adapter such as the database adapter 122, such that a control module acts as if it were a client relative to a database server (e.g., such as the database enterprise module 112). Operating in this manner, the control module can perform a database query and obtain a result (e.g., a result data set from the database resulting from the processing of the query), or perform an insertion or update operation in relation to the database. In addition, in some embodiments, a control module can operate as if it were itself a database server and accept SQL commands, such as select, insert, update, etc., from an enterprise module. Also, in some embodiments, JMS messaging is also supported using an adapter such as the JMS adapter 123. In such embodiments, a control module can provide a transition to a JMS messaging system, or can subscribe to a topic of a messaging system. In some such embodiments, all messaging systems based on JMS standard (including MQ) are intended to be supported.

Depending upon the embodiment, the industrial automation system 10 can be configured to operate in a variety of advantageous manners, particularly in view of the communication system 12 described above. Although it is the case that various enterprise modules such as the enterprise modules 18A-18E and 111-113 can generate messages at varying rates and generally require that the communication system 12 be able to carry messages at their rate of operation, various steps can be taken to guarantee or enhance quality of service. In particular, quality of service can be addressed by defining and tracking various quality of service parameters. These parameters can include bandwidth, the rate at which an application's traffic must be carried by the network; latency, the delay that an application can tolerate in delivering a packet of data; jitter, the variation in latency; and loss, the percentage of lost data. Indeed, the MSB 16 and execution frameworks can provide different delivery mechanisms with different quality of service parameters. Some execution frameworks can be limited to a preconfigured set of bindings having a preset quality of service, while other execution frameworks can choose configurable bindings with configurable quality of service parameters. The MSB 16 can be operated so as to guarantee that a requested quality of service parameter is provided for a channel between communicating modules even if the modules are deployed to different execution frameworks. User configurability of bindings is permitted as part of module configuration.

The MSB 16 also in at least some embodiments provides traceability and diagnostic tools so users can track and diagnose issues in the industrial control system. For example, to support traceability, the communication system 12 can include a logging mechanism with coordinated system time-stamping. A maintenance engineer can use various diagnostic tools to collect, correlate and combine message logs, such that a unified view of transferred messages can be displayed. Such diagnostic tools can provide a graphic display sequence of messages sent between sets of modules with precise time-stamping. The common service description allows users to decode message content and identify message exchange patterns in the entire system or a selected subsystem. Status information, such as number of messages sent, consumed, and/or forwarded can be collected. Because the integration of automation control and manufacturing software (enterprise) environments increases security concerns, the communication system 12 can include security features so that a module's access and/or a user's access to other modules or services can be restricted according to policies defined in the service description documents. Further, the MSB 16 includes the ability to check that messages come from an authenticated and authorized module. Data encryption of sensitive data can also be employed as required.

Figure 13:
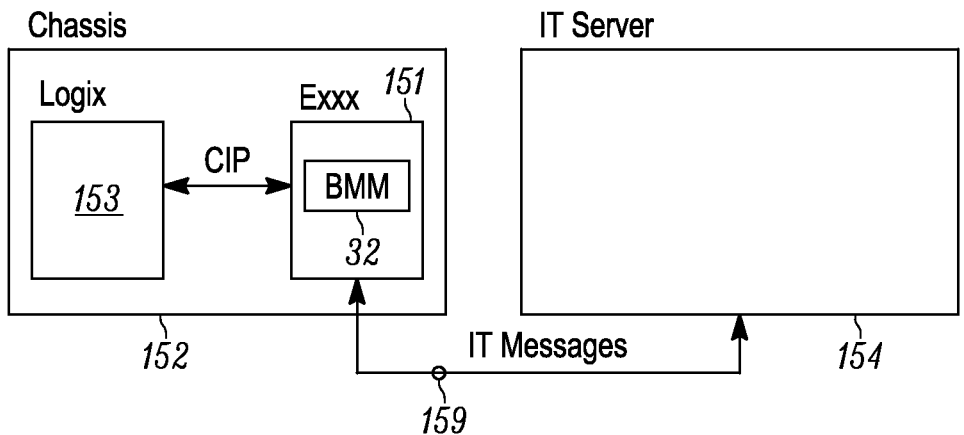
FIGS. 13-14 show two alternate hardware arrangements for industrial automation systems in accordance with other embodiments of the present invention.
Figure 14:
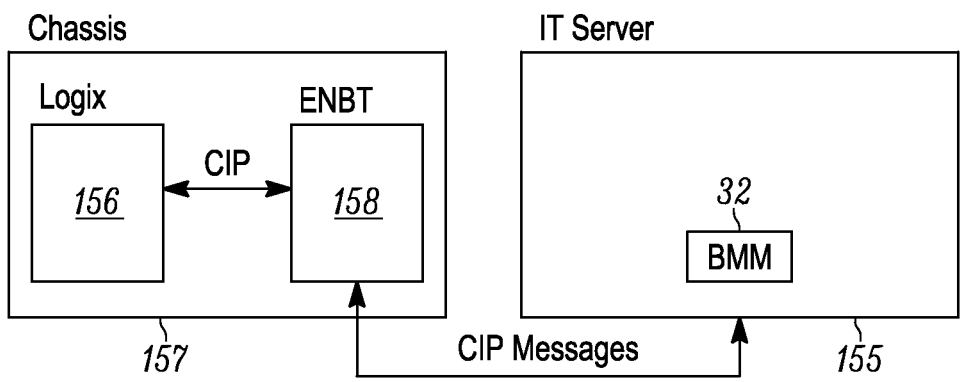

As already discussed above, the exact hardware implementations of the components of the industrial automation system 10 can vary considerably depending upon the embodiment. By comparison with the arrangement discussed above and shown in FIG. 1, in one alternate embodiment shown in FIG. 13 the bridge (or BMM) 32 is supported by way of an Exxx platform 151 that is on a shared chassis 152 that also provides the execution framework (for example, a Logix controller) 153 for one or more of the control modules. In such an embodiment, the bridge 32 can be in communication with one or more enterprise modules (e.g., send or receive communications that are IT messages) that are supported by an IT server 154 via an Ethernet network connection 159, while CIP communications between the bridge 32 and the control modules occur within the shared chassis 152. Also, in another alternate embodiment shown in FIG. 14, the bridge (or BMM) 32 is supported by an IT server 155 at which are also supported one or more enterprise modules (alternatively, the IT server 155 is merely in communication with such modules). In such embodiment, one or more control modules are again supported by an execution framework (which can again be supported by a Logix controller-based execution framework) 156, which in this case is provided by a shared chassis 157 that also includes an ENBT module 158. In such embodiment, CIP communications occur between both the control modules and the ENBT module, and also between the ENBT module and the bridge 32.

Figure 15:
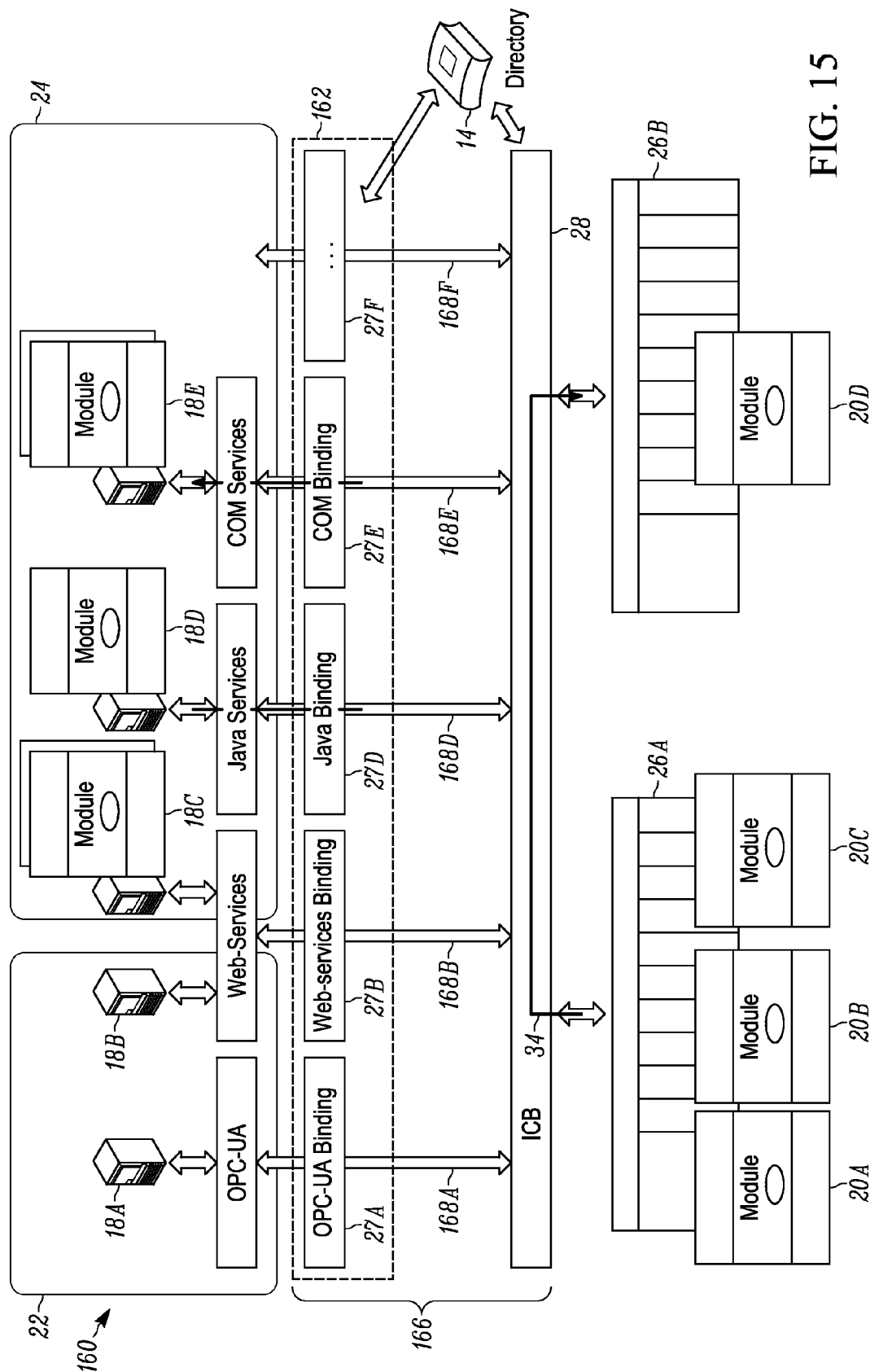
FIG. 15 is a schematic diagram of another exemplary industrial automation system including an exemplary communication system linking multiple modules in enterprise and control domains, in accordance with an alternate embodiment differing from that of FIG. 1.

Notwithstanding the embodiments discussed above, the present invention can encompass a variety of other configurations of industrial automation systems as well. Referring to FIG. 15, for example, an industrial control system 160 is shown that is simpler in certain respects by comparison with the industrial control system 10 of FIG. 1. As shown, more particularly, in this embodiment the industrial control system allows for communication between the enterprise modules 18A-18E hosted by the enterprise server 24 and control modules 20A-20D (which are the same as in FIG. 1) by way of an alternative intermediating system 166 that operates in place of the MSB 16 of FIG. 1. Further as shown, while the intermediating system 166 includes the same ICB 28 that is in communication with the control modules 20A-20D as in FIG. 1, and also includes the directory 14 of FIG. 1, the intermediating system no longer includes the ESB 30. Rather, in place of the ESB 30 and the bridge 32, the intermediating system 166 instead includes an alternative bridge 162 that includes the bindings 27A, 27B, 27D, 27E, and 27F of FIG. 1.

By virtue of the respective bindings 27A, 27B, 27D, and 27E, the alternative bridge 162 allows for communications to occur between the ICB 28 and the respective control modules 18A, 18B-18C, 18D, and 18E as represented by arrows 168A, 16B, 168D, and 168E (the binding 27F would allow for further communications between one or more other enterprise module(s) if the they were present as hosted by the enterprise server 24, as indicated by a further arrow 168F). The directory 14 further facilitates the communications between the ICB 28 and the alternative bridge 162. Because the alternative bridge 162 does not require all of the same components as the bridge 16, and in particular does not employ the ESB 30, the alternative bridge 162 is simpler than the bridge 16 and yet still can provide functionality that is similar to or even the same as that provided using the bridge 16 with the ESB 30, particularly in terms of allowing for communications to occur between the control modules and enterprise modules (and especially between each of the enterprise modules and any one or more of the control modules). Thus, the alternative bridge 162 ties together the control system and the enterprise system directly, without the need for the ESB 30.

The industrial automation system 10 described above including the communication system 12 and associated modules can be advantageous on numerous counts depending upon the embodiment. In particular, in at least some embodiments, the communication system 12 offers a controlled manner of interaction among various software applications, and allows for reliable, secure communications between software applications (provided in modules) to be achieved, regardless of system (or module) age, platform type, operating system, or implementation language. The use of the communication system 12 also allows for a reduction in the complexity of messaging within an industrial manufacturing system, and allows for the addition of new modules or modification of modules. The use of modules itself provides a consistent method for integrating legacy applications and control systems through the use of standard libraries of messaging definitions. The modular approach also provides an efficient system that is simple, reliable, and secure, has built in diagnostics, and comes with selectable levels of service in reusable "packages". Although discussed in the context of industrial automation, the present invention is also intended to encompass and apply to other types automation/computer systems that are outside of the industrial automation field as well.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of communicating between a control-level module and an enterprise-level module, the method comprising:
   receiving a first message in accordance with a first protocol from the control-level module at a receive manager of a bridge device, wherein the first protocol is an industrial protocol;
   sending a second message from the bridge device back to the control-level module when the bridge device has determined that the first message has been successfully received;
   analyzing the first message at a transaction manager of the bridge device so as to determine an adapter suitable for enabling further communication of the first message to the enterprise-level module;
   encoding, by the bridge device, a message header based at least in part upon the first message; and
   communicating a third message based upon the first message for receipt by the enterprise-level module through the use of the adapter, wherein the communicating of the third message occurs in accordance with a second protocol that is an information technology based or information technology oriented protocol,
   wherein the bridge device is a business message manager implemented on a server that either supports or communicates with the enterprise-level module, and wherein the first message is received via a network employing the industrial protocol, and
   wherein the industrial protocol employed by the network is a common industrial protocol (CIP) such that the network is a CIP-based network, and wherein the first message received via the CIP-based network is communicated via a class-3 connection.

2. The method of claim 1, wherein the bridge device is a business message manager implemented within a chassis upon which the control-level module is implemented, and wherein the communicating of the third message involves communication by way of an Ethernet network.

3. The method of claim 2, wherein the third message is communicated to a structured query language (SQL) database having a database driver.

4. The method of claim 1, wherein either the third message is communicated via message-oriented middleware (MOM), or the third message is a service-oriented architecture protocol (SOAP) message.

5. The method of claim 1, wherein the third message is communicated to a web server or a message queue entity.

6. The method of claim 1, wherein the bridge device is a business message manager implemented by a Java application.

7. The method of claim 1, wherein the bridge device includes, in addition to the transaction manager, a data transport layer including one or both of a receive manager and a transmit manager.

8. The method of claim 1, wherein the first message is a send message and the second message is a receive message.

9. The method of claim 1, wherein the bridge device employs one or both of a web service definition language (WSDL)-based file and an extensible markup language (XML)-based configuration file to configure one or more transactions.

10. The method of claim 1, wherein the bridge device includes a Java Messaging Service (JMS) adapter to bind industrial protocol and JMS messaging.

11. The method of claim 1, wherein the bridge device upon receiving the first message decodes the message header of the first message.

12. The method of claim 11 wherein, if a reply queue name is included in the message header, the bridge device creates a consumer to be able to receive a service response.

13. The method of claim 11, wherein the bridge device detects a destination queue name from the message header, and sends a service message to a destination queue.

14. The method of claim 13, wherein the service message is received by a service framework and, upon the receiving of the service message, the service framework causes an appropriate service to be invoked and further causes a response message to be sent to a response queue.

15. The method of claim 14, wherein the bridge device upon receiving the response message from the response queue decodes a further message header of the response message to find an industrial protocol message path, and wherein the bridge device encodes an additional message header to be sent back to the control-level module.

16. A method of communicating between a control-level module and an enterprise-level module, the method comprising:
receiving a plurality of packets in accordance with a first protocol from the control-level module at a receive manager of a bridge device, wherein the first protocol is an industrial protocol and the bridge device serves as a translator,
assembling the packets at the bridge device to form a first message;
sending a second message from the bridge device back to the control-level module when the bridge device has determined that the first message has been successfully received;
analyzing the first message at a transaction manager of the bridge device so as to determine an adapter suitable for enabling further communication of the first message to the enterprise-level module;
encoding, by way of the bridge device, a message header based at least in part upon the first message; and
communicating a third message based upon the first message for receipt by the enterprise-level module through the use of the adapter, wherein the communicating of the third message occurs in accordance with a second protocol that is an information technology based or information technology oriented protocol,
wherein the industrial protocol employed by the network is a common industrial protocol (CIP) such that the network is a CIP-based network, wherein the first message received via the CIP-based network is communicated via a class-3 connection, wherein the bridge device upon receiving the first message decodes the message header of the first message, wherein, if a reply queue name is included in the message header, the bridge device creates a consumer to be able to receive a service response, and wherein the bridge device detects a destination queue name from the message header, and sends a service message to a destination queue within the bridge device.

17. The method of claim 16, wherein the bridge device includes a CIP stack that serves as an intermediary interface between a data transport layer of the bridge device and the CIP-based network.

18. A method of communicating between a control-level module and an enterprise-level module, the method comprising:
receiving a first message in accordance with a first protocol from the control-level module at a receive manager of a bridge device, wherein the first protocol is an industrial protocol;
sending a second message from the bridge device back to the control-level module when the bridge device has determined that the first message has been successfully received; analyzing the first message at a transaction manager of the bridge device so as to determine an adapter suitable for enabling further communication of the first message to the enterprise-level module; and
communicating a third message based upon the first message for receipt by the enterprise-level module through the use of the adapter, wherein the communicating of the third message occurs in accordance with a second protocol that is an information technology based or information technology oriented protocol,
wherein the bridge device upon receiving the first message decodes a message header of the first message, wherein the bridge device detects a destination queue name from the message header, encodes the message header, and sends a service message to a destination queue, wherein the service message is received by a service framework and, upon the receiving of the service message, the service framework causes an appropriate service to be invoked and further causes a response message to be sent to a response queue,
wherein the bridge device upon receiving the response message from the response queue decodes a further message header of the response message to find an industrial protocol message path, and wherein the bridge device encodes an additional message header to be sent back to the control-level module, and
wherein the industrial protocol employed by the network is a common industrial protocol (CIP) such that the network is a CIP-based network, and wherein the first message received via the CIP-based network is communicated via a class-3 connection.

19. The method of claim 18, wherein the bridge device includes a CIP stack that serves as an intermediary interface between a data transport layer of the bridge device and the CIP-based network.

* * * * *